US011511891B2

(12) United States Patent
Aurigema et al.

(10) Patent No.: US 11,511,891 B2
(45) Date of Patent: Nov. 29, 2022

(54) SYSTEM AND METHOD FOR GENERATING FORCES USING ASYMMETRICAL ELECTROSTATIC PRESSURE

(71) Applicants: Andrew Neil Aurigema, Oak Hill, FL (US); Charles Raymond Buhler, IV, Merritt Island, FL (US)

(72) Inventors: Andrew Neil Aurigema, Oak Hill, FL (US); Charles Raymond Buhler, IV, Merritt Island, FL (US)

( * ) Notice: Subject to any disclaimer, the term of this patent is extended or adjusted under 35 U.S.C. 154(b) by 529 days.

(21) Appl. No.: 16/688,619

(22) Filed: Nov. 19, 2019

(65) Prior Publication Data

US 2020/0255167 A1 Aug. 13, 2020

Related U.S. Application Data

(60) Provisional application No. 62/769,415, filed on Nov. 19, 2018.

(51) Int. Cl.
*B64G 1/40* (2006.01)
*H02K 17/02* (2006.01)
(Continued)

(52) U.S. Cl.
CPC ............ *B64G 1/405* (2013.01); *F03H 1/0037* (2013.01)

(58) Field of Classification Search
CPC ....... B64G 1/405; B64G 1/409; F03H 1/0037; F03H 99/00
(Continued)

(56) References Cited

U.S. PATENT DOCUMENTS 6,200,539 B1 * 3/2001 Sherman ............. H05H 1/2406
134/1.1
2002/0012221 A1 * 1/2002 Campbell ............. H02N 1/002
361/306.3
(Continued)

FOREIGN PATENT DOCUMENTS

CA      2346240 A1 *  4/2000  ............. H02N 13/00
CA      2133685 C  *  8/2006  ............. G01L 11/008

OTHER PUBLICATIONS

International Search Report, PCT/US2019/062255, dated Jul. 16, 2020.
(Continued)

Primary Examiner — Jeffrey P Aiello
(74) Attorney, Agent, or Firm — Lowndes; Stephen C. Thomas

(57) ABSTRACT

A system and method for generating a force from a voltage difference applied across at least one electrically conductive surface. The applied voltage difference creates an electric field resulting in an electrostatic pressure force acting on at least one surface of an object. Asymmetries in the resulting electrostatic pressure force vectors result in a net resulting electrostatic pressure force acting on the object. The magnitude of the net resulting electrostatic pressure force is a function of the geometry of the electrically conductive surfaces, the applied voltage, and the dielectric constant of any material present in the gap between electrodes. The invention may be produced on a nanoscale using nanostructures such as carbon nanotubes. The invention may be utilized to provide a motivating force to an object. A non-limiting use case example is the use of electrostatic pressure force apparatus as a thruster to propel a spacecraft through a vacuum.

26 Claims, 23 Drawing Sheets

(51) Int. Cl.
  F03H 99/00     (2009.01)
  F03H 1/00      (2006.01)
(58) Field of Classification Search
  USPC ............ 324/71.1, 658; 702/65, 96, 138, 182
  See application file for complete search history.

(56) References Cited

U.S. PATENT DOCUMENTS

| | | | | |
|---|---|---|---|---|
| 2004/0011925 | A1* | 1/2004 | Grandies | B64G 1/421 244/62 |
| 2004/0089763 | A1* | 5/2004 | Redmond | B64D 27/24 244/10 |
| 2007/0279729 | A1* | 12/2007 | Kothari | G02B 26/001 359/291 |
| 2008/0116928 | A1* | 5/2008 | Kim | G03B 27/735 324/754.21 |
| 2015/0252795 | A1* | 9/2015 | Spruill | F03H 99/00 60/203.1 |

OTHER PUBLICATIONS

Babson et al. Hidden Momentum, field momentum, and electromagnetic impulse; Am. J. Phys., vol. 77, No. 9, Sep. 2009.
Thomas B. Bahder, Christian Fazi; Force on an Asymmetric Capacitor; Army Research Laboratory, Mar. 2003.
Barnett, Stephen M., Resolution of the Abraham-Minkowski Dilemma, Dept. of Physics, SUPA, University of Strathclyde, Glasgow, UK, Published Feb. 17, 2010, vol. 104, Issue 7-19.
Boyer, Timothy, H., Concerning Hidden Momentum, Dept. of Physics, University of NY, NY 10031, Sep. 21, 2007.
Brito, Hector Hugo., Propellantless Propulsion by Electromagnetic Inertia Manipulation: Theory and Experiment; Space Technology and Applications International Forum—1999.
Canning, Francis., Melcher, Cory., Winet, Edwin., Asymmetrical Capacitors for Propulsion, Institute for Scientific Research, Inc., Fairmont, West Virginia Oct. 2004.
Chen, Ma., Rong-De, Lu., Bang-Jiao, Ye., Surface aerodynamic model of the lifter, Journal of Electrostatics 71 (2013) 134-139.
Comay, E., Exposing "hidden momentum", School of physics and Astronomy, Tel Aviv University, Tel Aviv 69978, Mar. 28, 1996.
Einat, Moshe., Kalderon, Roy., High efficiency lifter based on the Biefeld-Brown effect, AIP Advanced 4, 077120 (2014); http://doi.org/10.1063/1.4890353, Published on-line Jul. 14, 2014.
Hnizdo, V., "Hidden momentum and the electromagnetic mass of a charge and current carrying body"., Department of Physics, Schonland Research Center for Nuclear Sciences, and Centre for Nonlinear Studies, University of the Witwatersrand, Johannesburg, 2050 South Africa, Aug. 23, 1996.
Franklin, Jerrold., "The electromagnetic momentum of static charge-current distributions", Department of Physics, Temple University, Philadelphia, PA 19122-6082, May 7, 2013.
Kobling, Matthias., Monette, Maxime., Weikert, Marcel., Tajmar, Martin., "The SpaceDrive project—Thrust balance development and new measurements of the Mach-Effect and EMDrive Thrusters", Institute of Aerospace Engineering, Technische Universitat Dresden, Marschnerstrasse 32, 01307 Dresden, Germany Acta Astronautica 161 (2019) 139-152.
Millis, G. Marc., "Assessing Potential Propulsion Breakthroughs", Glenn Research Venter, Cleveland, Ohio Dec. 2005.
Millis, G. Marc., "Assessing Potential Propulsion Breakthroughs", NASA, John H. Glenn Research Center at Lewis Field, Cleveland, Ohio, Ann. N.Y. Acad Sci. 1065: 441-461 (2005).
McDonald, Kirk T., "Momentum in a DC Circuit", Joseph Henry Laboratories, Princeton University, Princeton, NJ 08544, May 26, 2006.
McDonald, Kirk T., "Stress and Momentum in a Capacitor that moved with constant velocity", Joseph Henry Laboratories, Princeton University, Princeton, NJ 08544, Apr. 21, 1984; updated Oct. 4, 2007.
McDonald, Kirk T., "Hidden momentum of a steady current distribution in a system at "Rest"", Joseph Henry Laboratories, Princeton University, Princeton, NJ 08544, Apr. 21, 2009.
J.H. Poynting, "On the Transfer of Energy in the Electromagnetic Field", Trinity College, Cambridge, Professor of Physics, Mason College, Birmingham, Dec. 17, 1883.
Puthoff, H.E., Little, S.R., Ibison, M., "Engineering the Zero-Point Field and Polarizable Vaccum for Interstellar Flight", JBIS, vol. 55, pp. 137-144, 2002.
Tajmar, M., "Biefeld-Brown Effect: Misinterpretation of Corona Wind Phenomena", ARC Seibersdorf Research, A-2444 Austria, vol. 42, No. 2, Feb. 2004.
Tajmar, M., "Mach-effect thruster model" Acta Astronautica 141 (2017) 8-16.
Talley, R.L., "Twenty First Century Propulsion Concept", Veritay Technology, Inc., May 1991.
White, Harold., March, Paul., Lawrence, James., Vera, Jerry., Sylvester, Andre., "Measurement of Impulsive Thrust from a Closed Radio-Frequency Cavity in Vacuum", NASA Johnson Space Center, Houston, Texas 77058, Journal of Propulsion and Power, vol. 33, No. 4, Jul.-Aug. 2017.
Haofeng Xu et al., "Flight of an aeroplane with solid-state propulsion", 534 Nature, vol. 563, Nov. 22, 2018.
Zhao, L., Adamiak, K., "EHD gas flow in electrostatic levitation unit", Journal of Electrostatics 64 (2006) 639-645.

* cited by examiner $$\sum \vec{F}_x \neq 0$$
$$\sum \vec{F}_y = 0$$

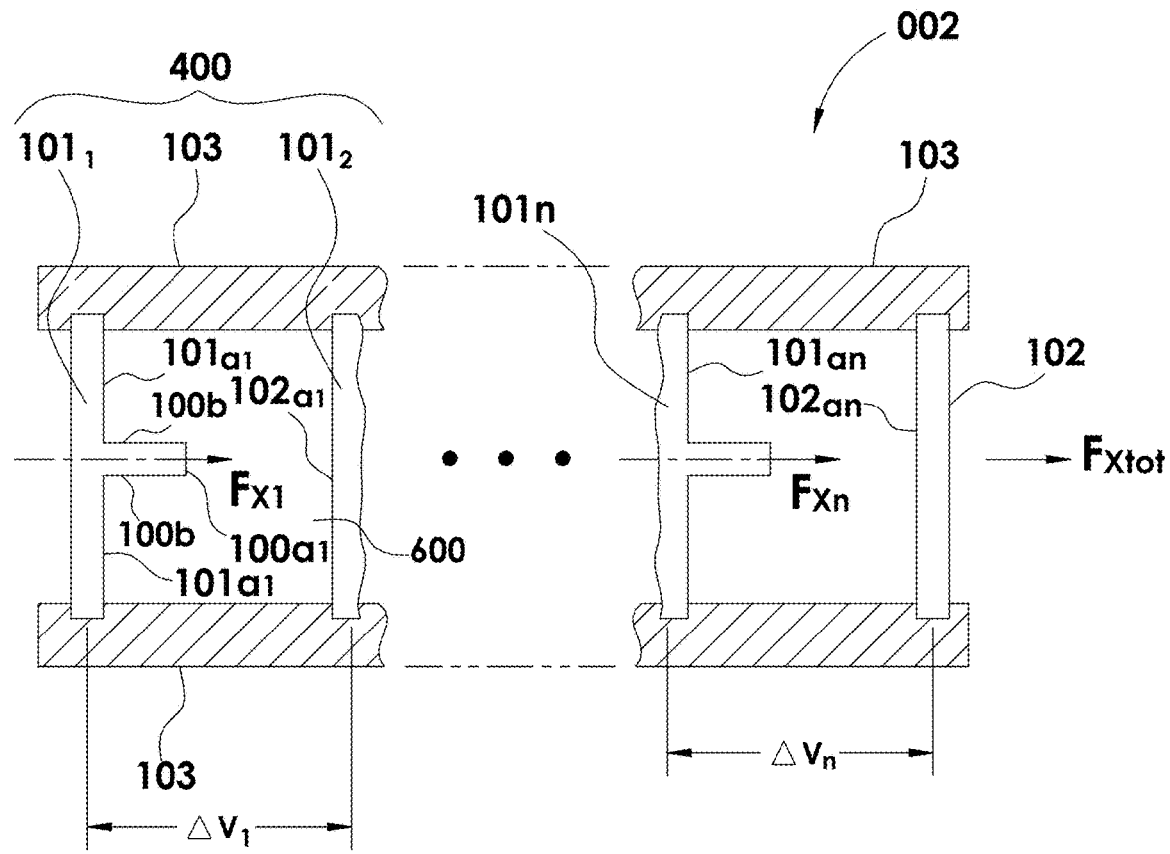
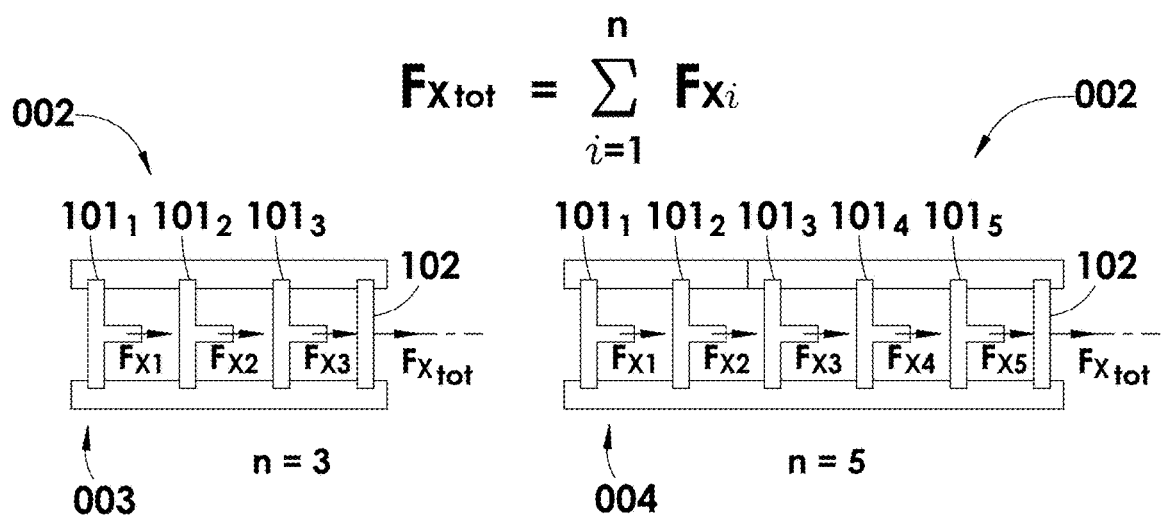
FIG. 9

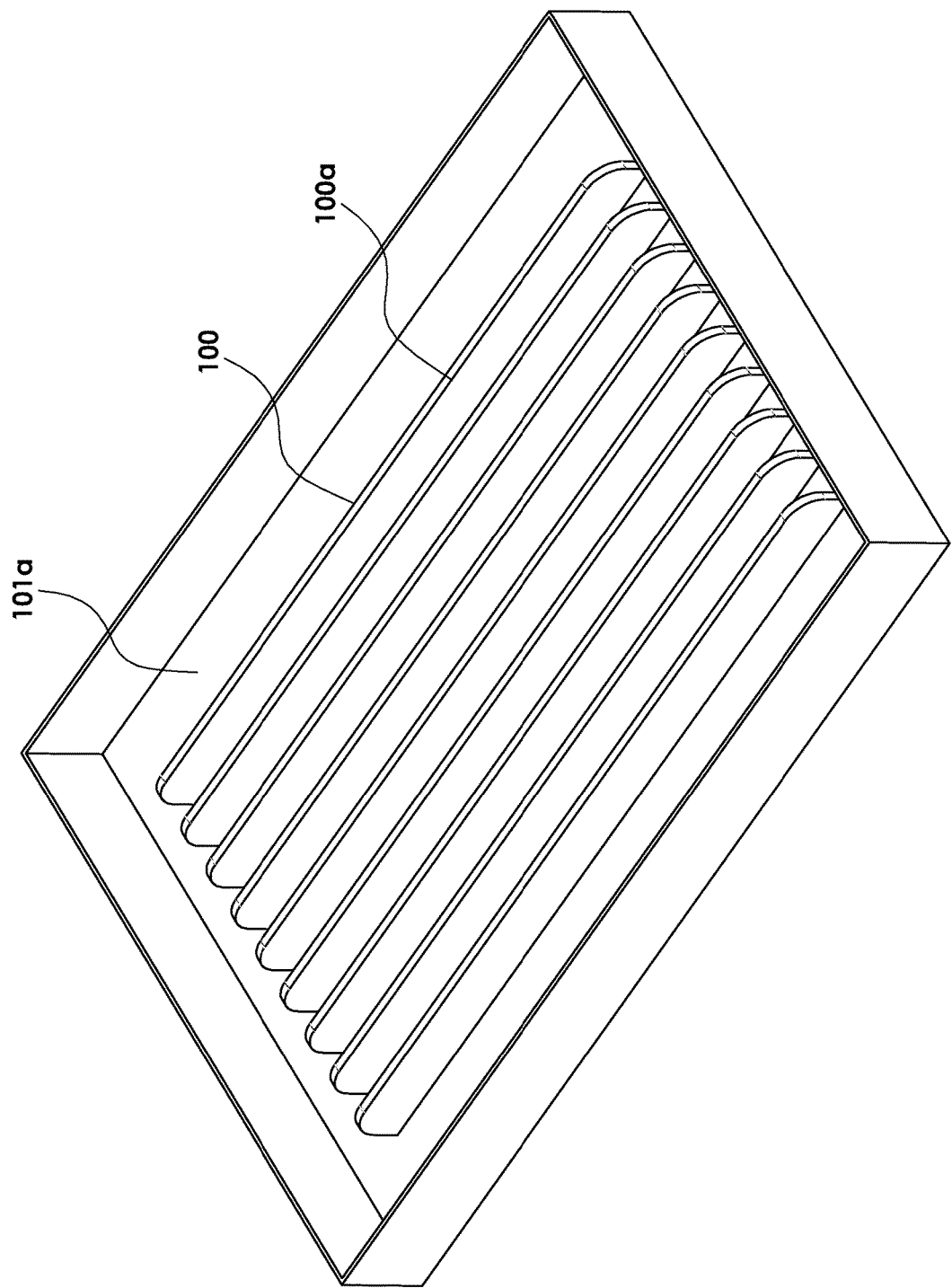
FIG. 21 Drawing used to 3D print a 9-bladed test article to be coated and filled with epoxy

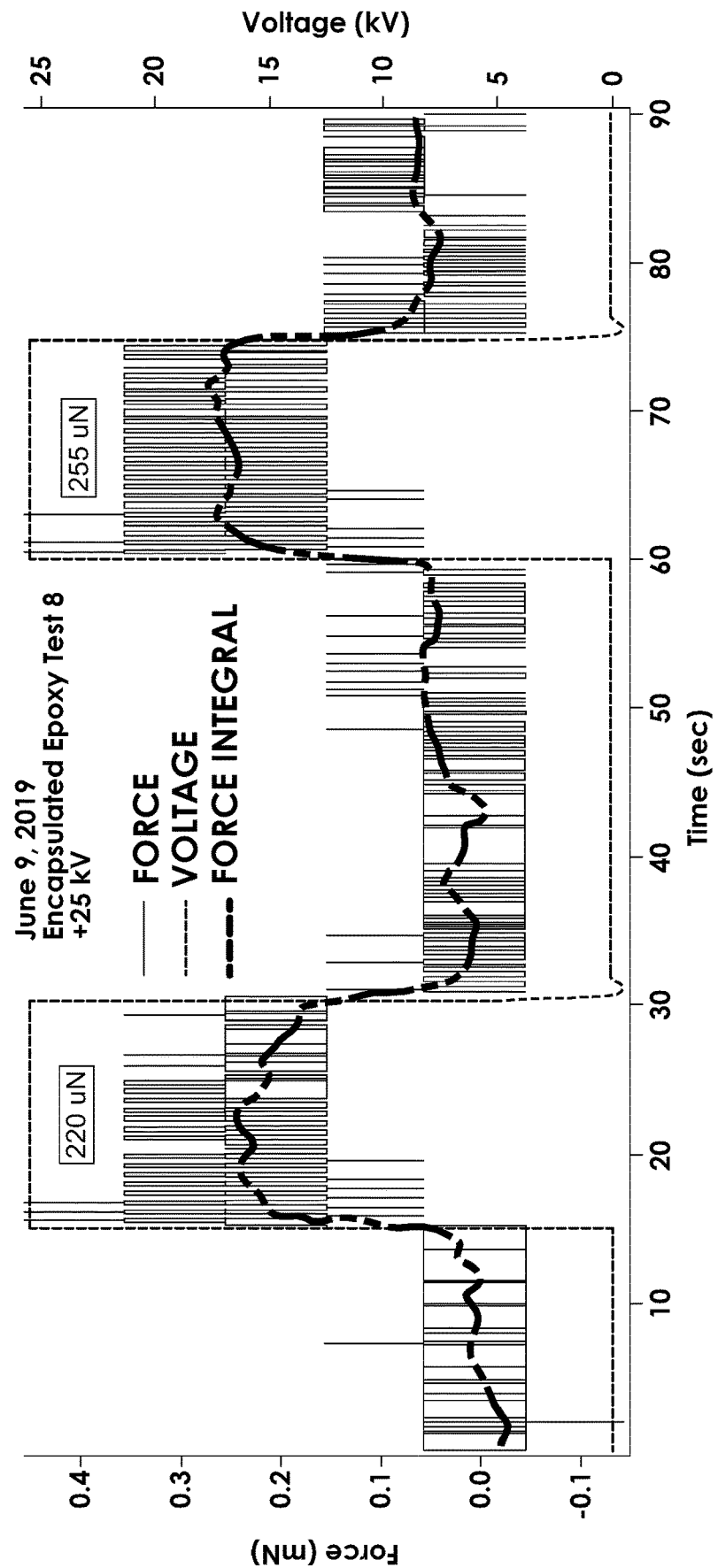
FIG. 22 Example of the force measured from the test device shown in FIG. 20.

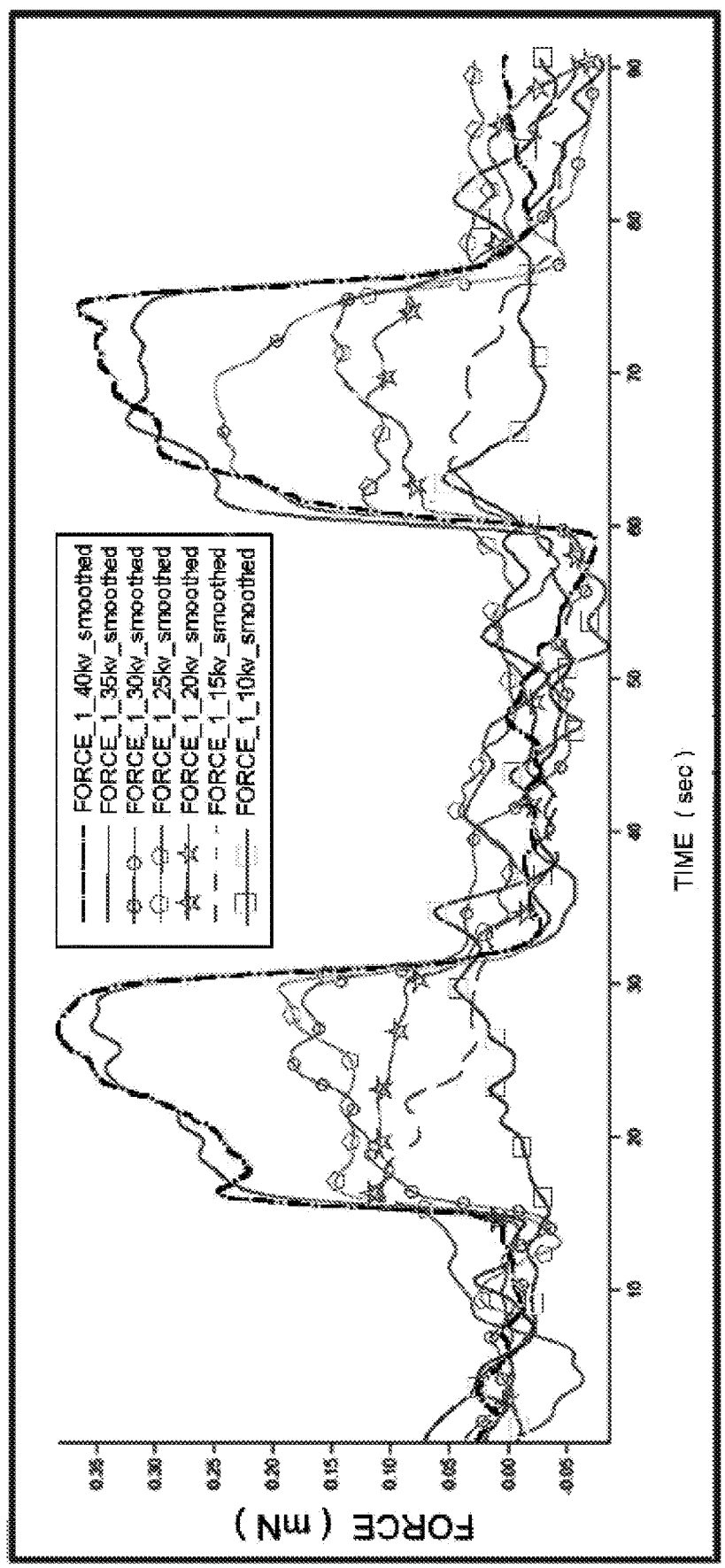
FIG. 23A Example of force measured on an epoxy filled test article as a function of applied voltage.

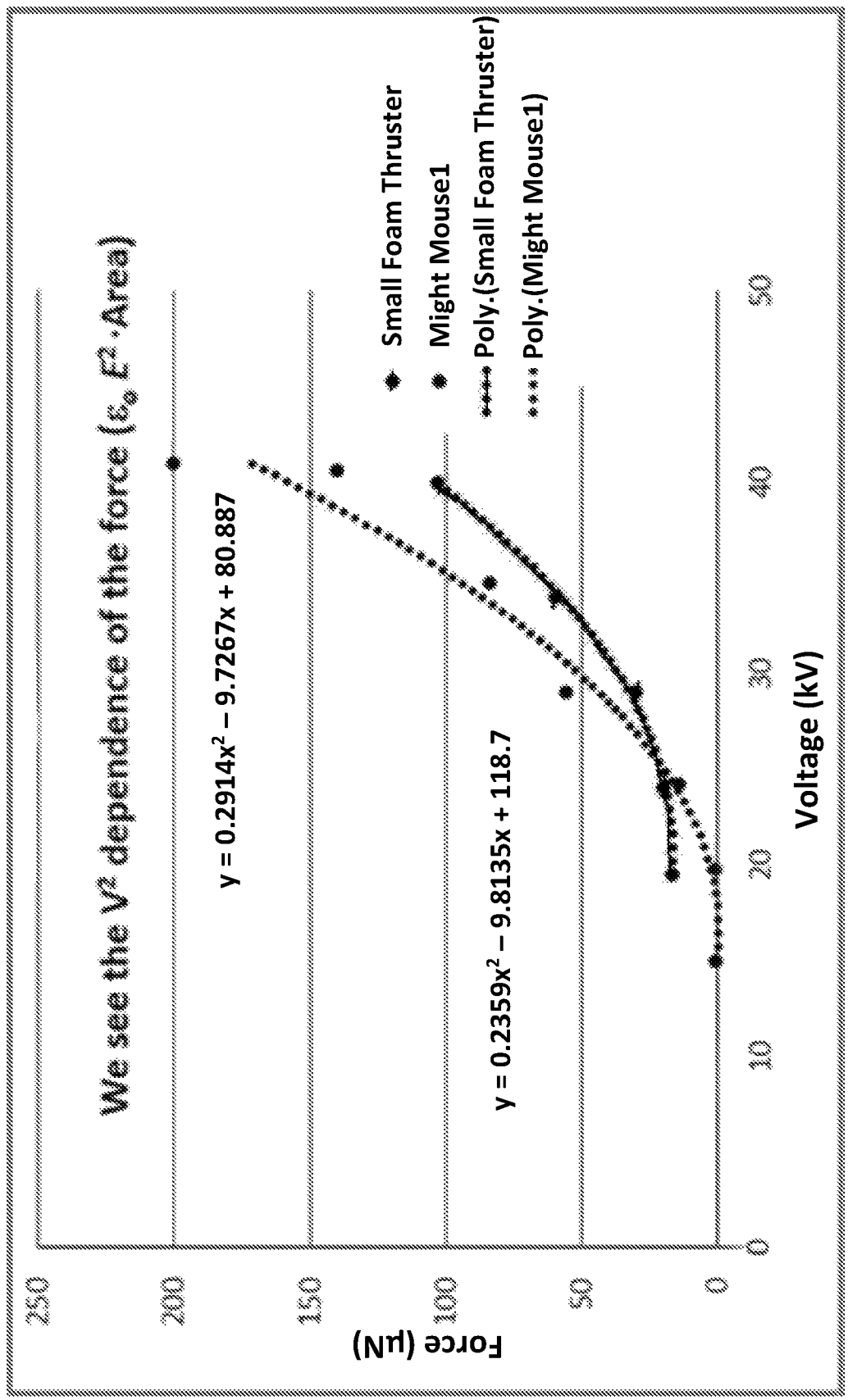
Fig. 23B Examples of force curves for two different test articles showing the $V^2$ dependence.

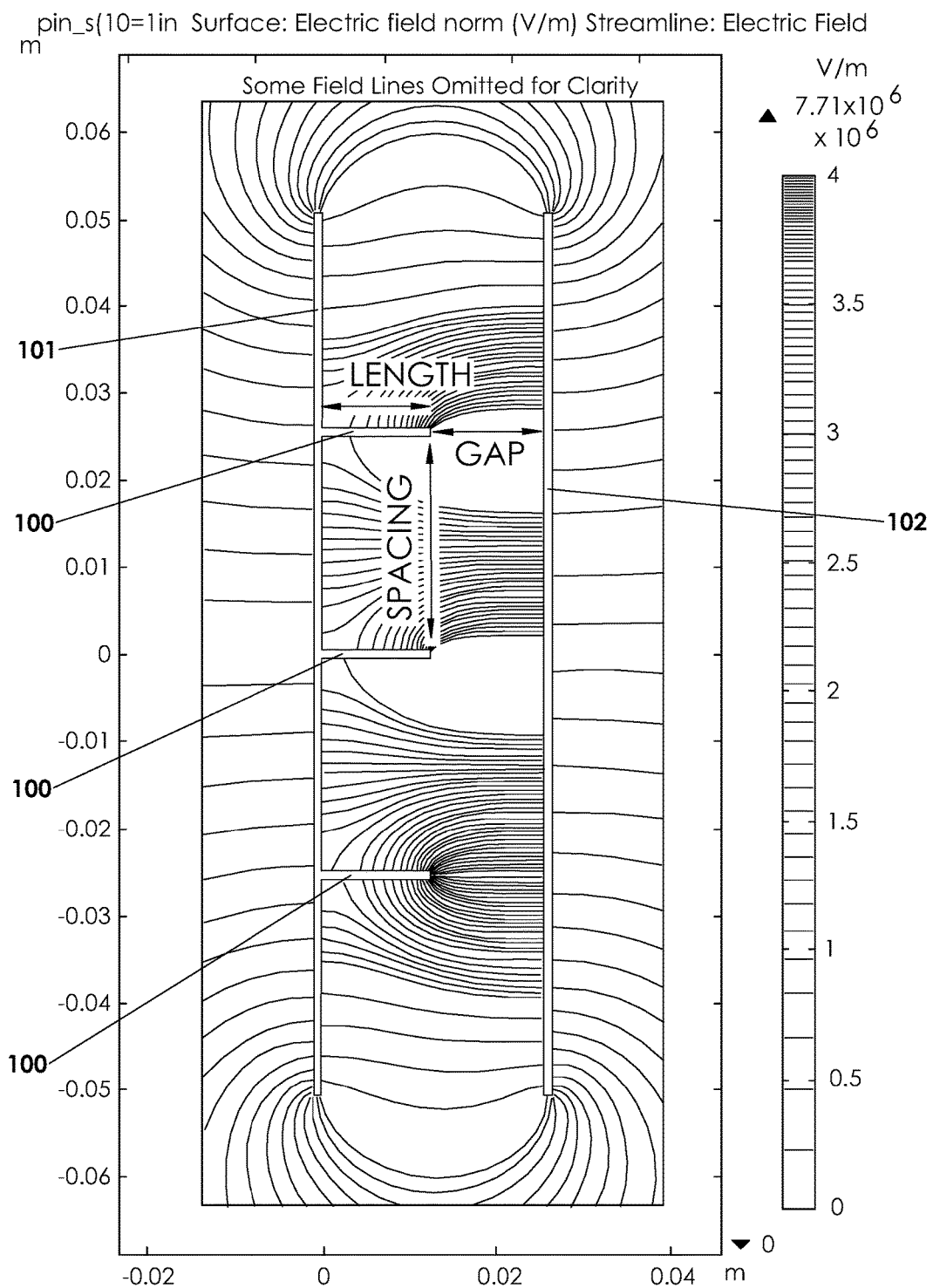
FIG. 24 COMSOL computational method results for a three-blade configuration showing the electric field lines from which the electrostatic pressure force may be calculated directly. In this case to the right.

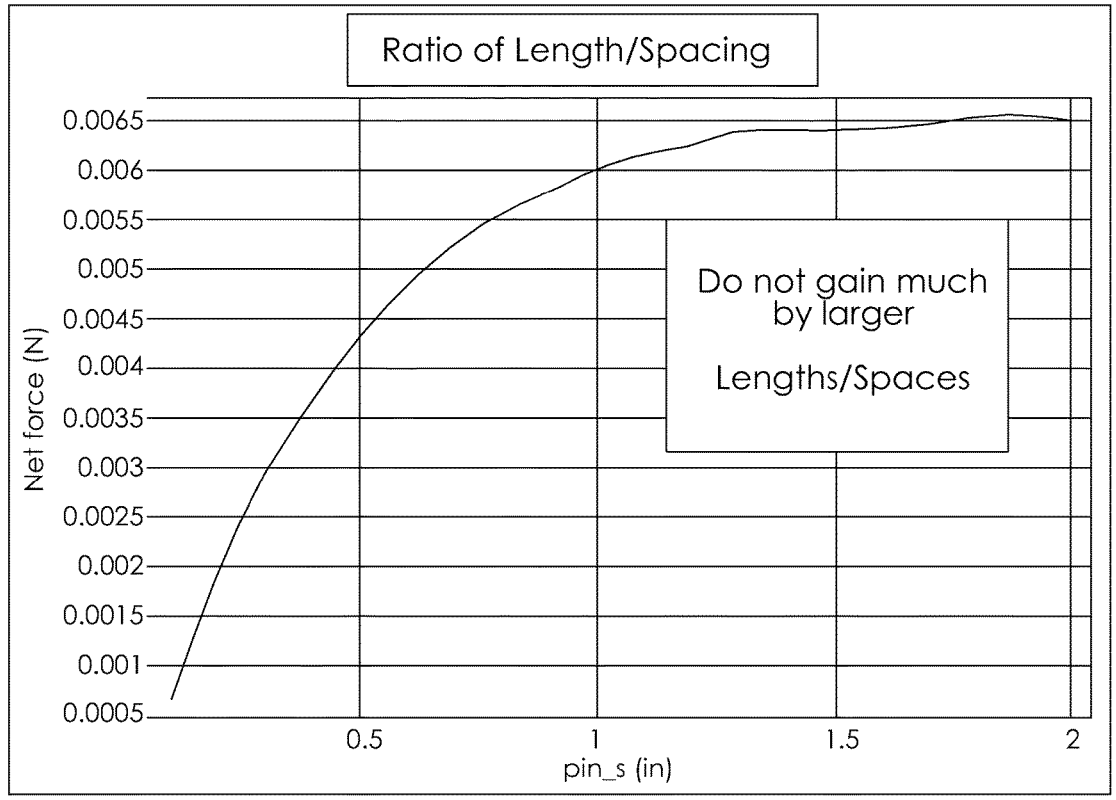
FIG. 25 The net force expected from the geometry of FIG. 24 using COMSOL as a function of the ratio of length/spacing for the electrodes.
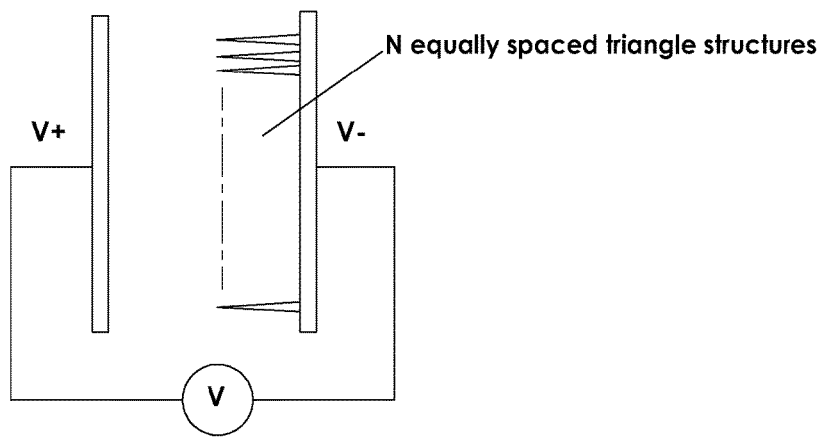
FIG. 26 Triangle electrode emobodiment

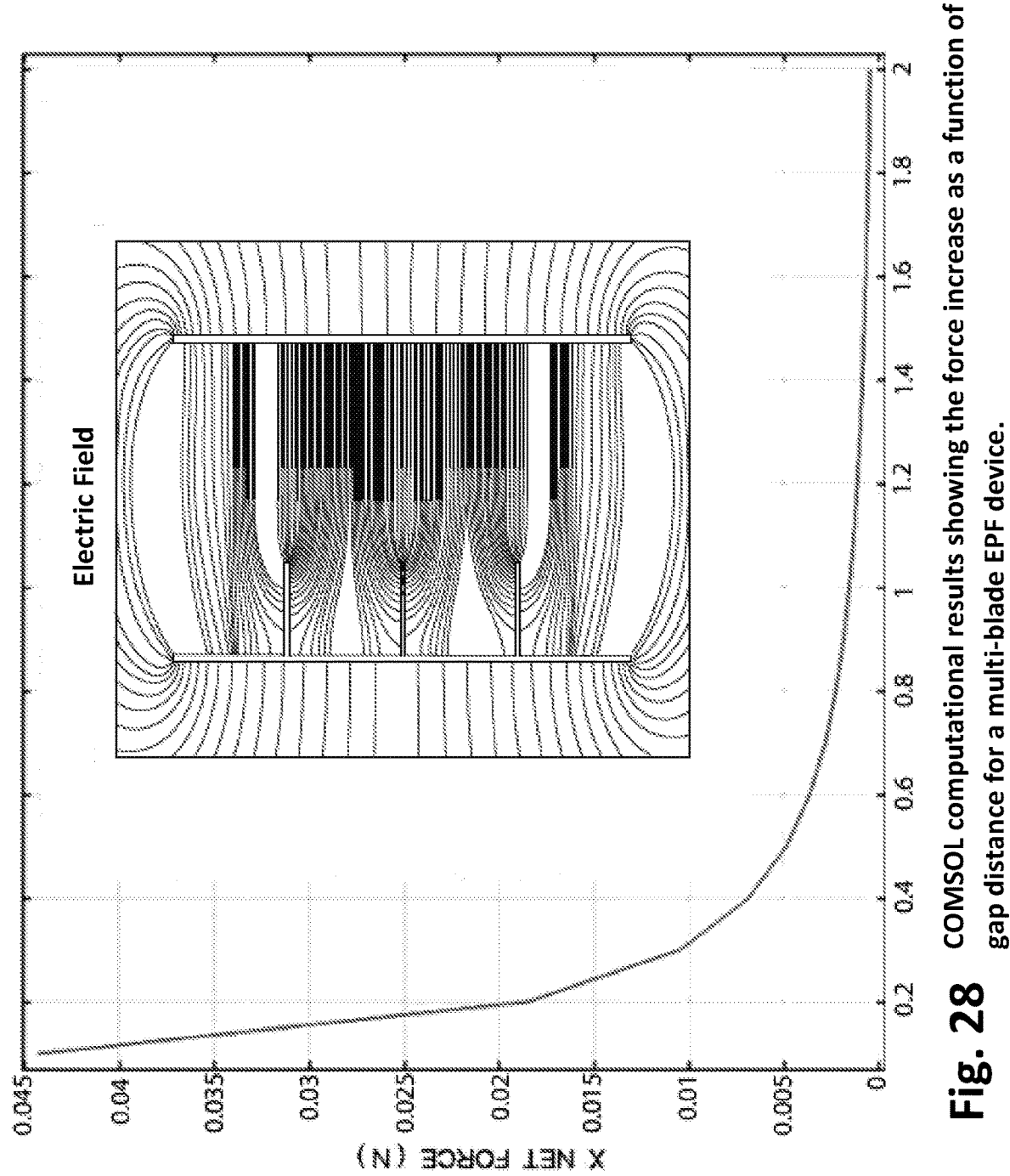
Fig. 28 COMSOL computational results showing the force increase as a function of gap distance for a multi-blade EPF device.

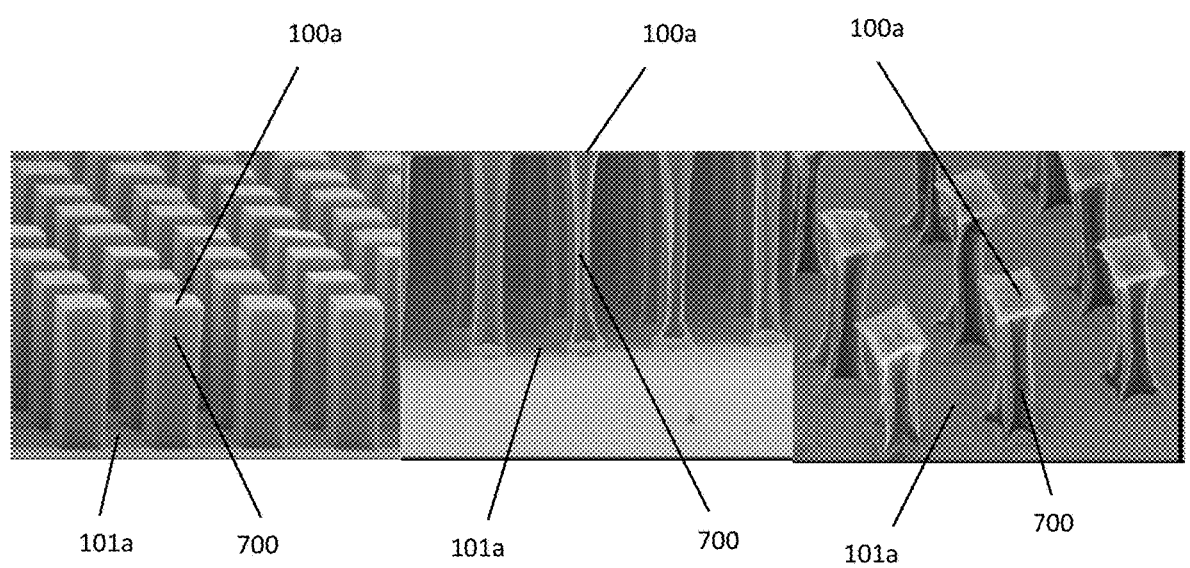
FIG. 29. Exemplary CNT structures for forming an electrode

SYSTEM AND METHOD FOR GENERATING FORCES USING ASYMMETRICAL ELECTROSTATIC PRESSURE

CROSS REFERENCE TO RELATED APPLICATIONS AND INCORPORATION BY REFERENCE

This non-provisional patent application is a non-provisional of, and claims the benefit of priority to, U.S. provisional patent application Ser. No. 62/769,415 titled A PROPELLANTLESS PROPULSION CONCEPT FOR SPACECRAFT BASED ON ELECTROSTATIC FIELD MOMENTUM TRANSFER, filed in the United States Patent and Trademark Office (USPTO) on Nov. 19, 2018, which is incorporated herein by reference in its entirety.

STATEMENT REGARDING FEDERALLY SPONSORED RESEARCH OR DEVELOPMENT

Not applicable.

INCORPORATION-BY-REFERENCE OF MATERIAL SUBMITTED ON A COMPACT DISK

Not applicable.

BACKGROUND OF THE INVENTION

1. Field of the Invention

The field of the invention relates generally to systems and methods for providing forces on objects in which such forces are generated by voltages, or voltage differences, when such voltages or voltage differences are applied to electrically conductive surfaces in such a way as to generate electrostatic pressure forces on an object. In embodiments, the field of the invention relates to systems and methods that make use of such forces in specific applications or use case. An exemplary use case, which is but one of many use cases, is the case in which it is desired to provide a motivating force on an object in the case which the object is disposed in a vacuum.

2. Background Art

The elimination of complex systems, such as, for example, machinery, utilized for the conversion of energy to motion has the potential to provide a great cost savings over, and greatly reduced weight and volume, over the systems of the prior art. The elimination of complex systems for converting energy to motion is especially desirable, for example, in the case of self-propelled vehicles such as spacecraft, aircraft and watercraft. For example, the mass of a body or object to be accelerated is the single largest driving parameter of spacecraft design. For example, in order to motivate a spacecraft through space (i.e., through a vacuum) or maintain its location against external influence such as gravitational forces, spacecraft must carry within themselves all the propellant mass, excitation energy, and mechanical structure to generate physical thrust. As regarding the systems of the prior art, it is only through exhausting high velocity gas that physical momentum may be transferred to a spacecraft. This momentum over time is what accelerates the spacecraft and achieves a desired motion, or motivation, of the spacecraft. Again, as an example, commercial satellites typically reserve 85% or more of their total mass per volume budget for propulsion related activities. That is to say, due to the low efficiency of chemical and/or electrically enhanced chemical propulsion systems, 85% or more of the total weight per volume of a spacecraft is expended in propulsion related activities. A spacecraft's mission capability is therefore determined in large part by the amount of physical thrust that can be extracted from the stored propellant. The total amount of physical thrust available to a spacecraft is determined by the efficiency of the propulsion system and the total amount of propellant stored on the spacecraft. When a spacecraft's stored propellant is expended, the ability to control the path, or maintain precise location, of the spacecraft is brought to an end. Without the ability to react to external forces, the spacecraft ceases to be an asset and becomes a liability. Simply put, spacecraft become space junk when their stored propellant is exhausted.

Since any conversion of energy from one form to another is accompanied by losses due to friction, radiation or conduction of heat, hysteresis, and the like, it is needful that advances in the state of the art be developed that increase the efficiency of producing forces which may be used to motivate an object. It is especially desirable that such advances in the state of the art be in a form that eliminates the need for the use of stored propellant so that vehicles such as, for example and not by way of limitation, spacecraft using such a systems and method could greatly reduce, or even eliminate, their dependency on stored propellant and propellant based propulsion systems. Such advances, if realized, would greatly enhance the present ability to motivate payloads, increase the lifetime of spacecraft and other devices and systems, and thereby enable entirely new uses for such systems. Such advances would enable new systems and methods for providing applied forces for any number of use cases, one example of many, being the motivation of an object. It is an object of the present invention to utilize the energy stored in an electric field, or fields, to provide such applied forces.

The notion of using electric fields as a method of propulsion was previously explored as far back as the 1920's by, for example, Thomas Townsend Brown ("Brown"). Brown discovered that a force was developed on a Coolidge tube when the tube was subjected to a high voltage. His electric field force effect is an electrical phenomenon, which employs an electric field for generating applied forces, which could be used, for example, to motivate a spacecraft without exhausting propellant. As disclosed in U.S. Pat. No. 2,949,550 [Brown 1957] and U.S. Pat. No. 3,187,206 [Brown 1958], as an "electrokinetic" phenomenon, electrical energy can be converted to mechanical energy which is then used to provide a force for providing movement to a structure. There were several patents describing propellentless propulsion devices based on this effect coined the "Biefeld-Brown Effect" named after Brown and his graduate school advisor, Dr. Paul Alfred Biefeld. Brown and Biefeld were U.S. Pat. No. 2,949,550 [Brown 1957], U.S. Pat. No. 3,018,394 [Brown 1957a], and U.S. Pat. No. 3,187,206 [Brown 1958] for devices based on utilization of the effect. Brown's colleague A. H. Bahnson was similarly issued U.S. Pat. No. 2,958,790 [Bahnson 1958], U.S. Pat. No. 3,223,038 [Bahnson 1965], and U.S. Pat. No. 3,227,901 [Bahnson 1966] utilizing the effect.

There has been recurring interest in these devices since the work of Brown. In one configuration, two asymmetrical capacitors are arranged to rotate about a vertical axis, termed Asymmetrical Capacitor Thruster (ACT). Another common configuration involves one capacitor plate of a capacitor plate pair being disposed above its mate, arranged so the device can lift off of the ground. This device is called a lifter. Alexander de Seversky investigated lifters during the 1960's with his "Ionocraft" and received a U.S. patent [Seversky, 1964]. De Seversky's craft combined a series of wires perpendicular to a mesh plate to lift the device. J. L. Naudin and others have constructed devices similar to the original Brown patent, and then assembled multiple devices into larger designs to create "lifters" that perform similarly to de Seversky's craft. These designs vary greatly in size and shape; some are comprised of multiple cells, or comprise stacked layers of cells, to create more efficient and more powerful devices. Other such devices are disclosed in U.S. Pat. No. 6,492,784 to Hector Serrano [Serrano 2002], which generates the Biefeld-Brown Effect using stacked-disc asymmetrical capacitors.

NASA also has investigated the use of Brown's discovery. Jonathan Campbell of NASA's Marshall Space Flight Center has designed and tested ACTs that use dielectrics to increase their thrust, receiving U.S. patents for this work in 2001 and 2002 as disclosed in U.S. Pat. Nos. 6,317,310, 6,411,493, and 6,775,123 [Campbell 2001, 2002, and 2003].

Thomas Bander and Chris Fazi [Bander and Faze 2002] of the Army Research Lab (ARL) in Adelphi, Md. have also reported work on the subject. They constructed multiple devices, both original and reproductions of designs found on the internet and made qualitative observations. Bander and Fazi's paper includes a brief history and an attempt at an explanation of the cause of the force observed. However, they conclude that "At present, the physical basis for the Biefeld-Brown effect is not understood."

An early test of this effect in vacuum was performed by Robert Talley [Talley et al., 1991] of Veritay Technology performed in the late 1980's under an Air Force contract. Talley suspended a sphere-disk ACT from a suspension wire and measured torsion forces on it. This gave him the sensitivity to be able to measure small forces. This lengthy report is one of only two written on this effect describing a measurement of a force while in a vacuum chamber. Talley ultimately attributed the force that he observed to the electrostatic interaction between the chamber and the device. Talley wrote, "Direct experimental results show that under high vacuum conditions . . . no detectable propulsive force was electrostatically induced by applying a static potential difference . . . between test device electrodes . . . " Talley concluded (page 91 of his report), "If such a force still exists and lies below the threshold of measurements in this program, then the force may be too small to be attractive for many, if not most, space propulsion applications." While this work makes a strong case against the ability of these devices to produce a force in a vacuum, it did not address the use of asymmetrical capacitors in the atmosphere.

Follow-on work was performed by NASA to evaluate the technology. A comprehensive review of the current state of the art can be obtained from Canning, Francis X., Melcher, Cory, and Winet, Edwin, *Asymmetrical Capacitors for Propulsion*, Glenn Research Center of NASA (NASA/CR-2004-213312), Institute for Scientific Research, October, 2004. Canning [2004] showed that a majority of asymmetrical capacitors (ACTs) exhibit a null thrust unless there is an accompanying ion wind. They performed tests on cylindrical-disk geometries under applied voltage in a vacuum bell jar and concluded that there were no forces produced in a vacuum. They find that their operation is "fully explained by a very simple theory that uses only electrostatic forces and the transfer of momentum by multiple collisions".

Nearly all patents described above include an electrode at a high voltage in air, the consequence of which is that the air is ionized as electrons are stripped from its gas molecules. Once the gas ions are charged, they will traverse toward the electrode of the opposite polarity as directed by the field. This current is known as corona current. These gas ions bombard other neutral gas ions which in turns produces a net movement on the gas which is normally ~1 m/s. Since these thrusters are comprised of an asymmetry of the electrical field there is only one direction of gas movement emanating from the sharp electrode to the dull electrode. The sharp electrode creates a higher electric field locally which ionizes the gas whereas the dull electrode does ionize the gas. This asymmetry gives rise to the direction of the wind regardless of the polarity of the electrodes. In all cases, momentum is conserved by having a net ion wind in one direction, and the momentum on the asymmetrical capacitor in the opposite direction. There are applications that take advantage of this effect, such, for example, devices such as lifters. In 2018, Professor Steven Barrett of MIT made headlines by building a horizontal aircraft fly across a gym with no moving parts using ion wind thrust [Xu et al., 2018] and spoke at a recent Electrostatics Society of America conference on the subject.

Many of the above patents make no reference to ion-wind effects; and, experimenters, including Brown, do not mention methods to mitigate this well-known ion-wind effect. As a result, many authors who test asymmetrical capacitors believe the force they observe will have some use either in space or for large aircraft, both of which are impossible for ion-wind versions. Therefore, the current state of the art of the use of electrical energy for the direct production of linear force and motion is through ion wind propulsion or one of the two technologies mentioned below.

The most current example of a propellantless field propulsion system is an electromagnetic drive system as disclosed in British Patents GB2229865, GB2334761, GB2399601 and UK Patent Application GB2537119 to Shawyer, as well as U.S. Pat. Appl. No. 20140013724 to Fetta. This system includes an axially-asymmetric resonant cavity with a conductive inner surface adapted to support a standing electromagnetic (EM) wave. The resonating cavity lacks second-axis axial symmetry, thereby causing the standing EM wave to induce a net unidirectional force on the resonant cavity, thus generating thrust without reaction mass. Experimental versions of these EM devices have reportedly produced thrust levels of micro-newtons up to milli-newtons from several kilowatts of input power (AIAA Journal of Propulsion and Power, op.cit.).

Field modification approaches to propellantless propulsion include apparent reductions in gravitational mass or inertial mass. U.S. Pat. No. 3,626,605 to Wallace discloses a method and apparatus for generating a time-variant non-electromagnetic force field due to the relative motion of moving bodies constituted of elements whose nuclei have half integral "spin" values, with said force field exhibiting itself in the form of an induced secondary gravitational force. U.S. Pat. No. 5,280,864 to Woodward in 1994 discloses a method for producing transient fluctuations in the inertial masses of material objects by employing an effect that is a consequence of relativistic theories of gravitation. This patent is a continuation in part of application Ser. No. 07/521,992 filed in 1990 as CIP of U.S. application Ser. No. 07/031,157 filed in 1987 as CIP of application 6/919,647 filed in 1986, now all abandoned. The patent basically uses high frequency vibrating piezoelectric force transducers to accelerate a capacitor array while applying high frequency AC to electrically oscillate ions in the dielectrics. The relativistic Mach Effect was predicted to produce unidirectional forces.

In subsequent U.S. Pat. Nos. 6,098,924, 6,347,766 and 9,287,840, Woodward disclosed various improvements to the device of U.S. Pat. No. 5,280,864 for producing propellantless thrust by using piezoelectric force transducers attached to resonant mechanical structures, in accordance with Mach's principle and local Lorentz-invariance predictions of transient rest mass fluctuations in accelerated objects. The device was designated the "Mach Effect Thruster". The latest U.S. Pat. No. 9,287,840 in 2016 incorporates acceleration and temperature feedback sensors in the electronics control system, uses a DC bias voltage superimposed on the high frequency the AC voltages to activate transducers, and applies pulsed AC waveforms. With these improvements, the device produced 6-7 micronewtons of thrust with a 100 W power input, which is approximately 14 megawatts/Nt. The disclosure admits that the device is not scalable and that arrays of multiple small devices would be necessary to generate larger thrusts.

In U.S. Patent Application Publication No. 2006/0065789, Woodward introduced his "flux capacitor" which proposed modifications to the devices of U.S. Pat. Nos. 5,280,864, 6,098,924, and 6,347,766 to overcome a serious internal propagation speed problem. The force transducers were eliminated, and the capacitor arrays were either enclosed within induction coils or external induction coils were aligned with axes perpendicular to the displacement fields in the capacitor. The objective was to replace transducer accelerations by using induction coils to generate perpendicular magnetic field oscillations of the dielectric ions.

None of the above described systems or methods satisfy the stated need in the art.

BRIEF SUMMARY OF THE INVENTION

The present invention comprises an apparatus and method that have one or more of the following features and/or steps, which alone or in any combination may comprise patentable subject matter.

Generally, the system and method of the invention satisfies the stated need in the art by generating a force usable for any purpose, such as, by way of example and not by limitation, thrust, motivating force or actuation, without the use of any expelled propellant, or any propellant at all. The system and method of the invention takes advantage of an aspect of the conservation of momentum for electromagnetic systems in a novel way, in which a net force is generated on a system or object by imbalances of electrostatic pressure. This "Electrostatic Pressure Force (EPF)" has been thoroughly tested by the inventors and has been verified repeatedly in a laboratory environment using a variety of independent configurations for the system of the invention.

In accordance with one embodiment of the present invention, the invention comprises an apparatus for generating a force on an object, comprising an object that comprises at least one electrode having at least one electrically conductive surface, wherein at least one voltage is applied to said at least one electrically conductive surface. The application of said at least one voltage to said at least one electrically conductive surface generates an electric field giving rise to an electrostatic pressure acting on at least one surface of said object, thereby generating a electrostatic pressure force on said at least one surface. The electrostatic pressure force may be characterized by a net resulting electrostatic pressure force acting on said object.

In an embodiment, the net resulting electrostatic pressure force may be characterized as being the vector sum of all electrostatic pressure forces acting on the object, and wherein t net resulting electrostatic pressure force may be characterized as acting along an axis.

In an embodiment, the shape and geometric arrangement of the conductive surfaces and the value of the at least one voltage, may each be defined by computational methods to achieve a desired net resulting electrostatic pressure force acting on the object.

In accordance with another embodiment of the present invention, the invention comprises an apparatus for generating a force on an object, comprising an object having a plurality of electrically conductive surfaces, each of the electrically conductive surfaces betting attached to one another by non-electrically conductive means; wherein a voltage may be applied to two or more of the electrically conductive surfaces, each of the electrically conductive surfaces receiving a different voltage, thus creating a voltage difference as between the electrically conductive surfaces, wherein the voltage difference generates an electric field giving rise to an electrostatic pressure acting on at least one surface of the object, thereby generating an electrostatic pressure force on said at least one surface of the object; and wherein the electrostatic pressure force is characterized by a net resulting electrostatic pressure force acting on said object.

In an embodiment, the net resulting electrostatic pressure force may be characterized as being the vector sum of all electrostatic pressure forces acting on the object, and the net resulting electrostatic pressure force may be characterized as acting on said object along an axis.

In an embodiment, the shape and geometric arrangement of the conductive surfaces and the value of the at least one voltage may each be defined by computational methods to achieve a desired net resulting electrostatic pressure force acting on the object.

In an embodiment, the plurality of electrically conductive surfaces may be further defined as at least one set of opposing electrically conductive surfaces, wherein each of the set of opposing electrically conductive surfaces comprises a first electrically conductive surface and an opposing second electrically conductive surface; wherein said voltage is further defined as a first voltage and a second voltage, each of said first voltage and said opposing second voltage having a different voltage value, forming an voltage difference as between them; wherein said first voltage is applied to said first electrically conductive surface, and said second voltage is applied to said second electrically conductive surface, causing said electric field to be generated between said first electrically conductive surface and said second electrically conductive surface.

In an embodiment, the first electrically conductive surface may comprise at least one proximal electrically conductive surface and at least one distal electrically conductive surface, the at least one proximal electrically conductive surface being in closer proximity to the second electrically conductive surface than the at least one distal electrically conductive surface.

In an embodiment, the invention may further comprise further an electrically conductive surface that extends from the at least one electrically conductive proximal surface distal surface to the at least one electrically conductive proximal surface proximal surface.

In an embodiment, the second electrically conductive surface may be further defined as comprising a flat planar surface.

In an embodiment, the at least one proximal electrically conductive surface and at least one distal electrically conductive surface may further be defined as a plurality of proximal electrically conductive surfaces and a plurality of distal electrically conductive surfaces, respectively.

In an embodiment, the at least one set of electrically conductive opposing surfaces may be further defined as a plurality of sets of electrically conductive opposing surfaces, resulting in a total net resulting electrostatic pressure force equaling the vector sum of all resulting net electrostatic pressure forces generated by the electrostatic pressure operating on surfaces of the object, the total net resulting electrostatic pressure force acting on the object.

In an embodiment, each set of electrically conductive opposing surfaces may be aligned along an axis that is collinear with the vector of each of the resulting net electrostatic pressure force, such that each of the resulting net electrostatic pressure forces is summed into a total net electrostatic pressure force acting on the body along the axis.

In an embodiment, the electrically conductive distal surface, the electrically conductive surface extending from the electrically conductive distal surface to the electrically conductive proximal surface, and the electrically conductive proximal surface form a blade configuration.

In an embodiment, each of the first electrically conductive surfaces comprises a plurality of electrically conductive proximal surfaces and a plurality of electrically conductive distal surfaces, wherein each electrically conductive proximal surface may be in electrical communication with at least one electrically conductive distal surface by an electrically conductive surface extending from the at least one electrically conductive distal surface to the electrically conductive proximal surface.

In an embodiment, each of the first electrically conductive surfaces of each set of electrically conductive surfaces may comprise a plurality of electrically conductive proximal surfaces and a plurality of electrically conductive distal surfaces, wherein each electrically conductive proximal surface is in electrical communication with at least one electrically conductive distal surface by an electrically conductive surface extending from said at least one electrically conductive distal surface to said electrically conductive proximal surface.

In an embodiment, each of the electrically conductive surfaces may comprise at least one carbon nanotube.

In an embodiment, each of the electrically conductive surfaces may comprise a plurality of carbon nanotubes.

In an embodiment, the voltage is time-varying.

In an embodiment, the invention may comprise an electrostatic pressure force thruster for a vehicle, comprising:

a structure comprising a plurality of electrically conductive surfaces, each of said electrically conductive surfaces attached to one another by non-electrically conductive means, forming a structure adapted to be attached to a vehicle having a center of mass;

wherein a voltage is applied to two or more of said electrically conductive surfaces, each of said electrically conductive surfaces receiving a different voltage, thus creating a voltage difference as between the electrically conductive surfaces;

wherein the voltage difference generates an electric field giving rise to a non-uniform electrostatic pressure acting on at least one surface of said object, thereby generating a non-uniform electrostatic pressure force on said at least one surface of said object;

wherein said non-uniform electrostatic pressure force is characterized by a net resulting electrostatic pressure force acting on said object, said net resulting electrostatic pressure force being characterized as having a vector;

wherein said resulting net electrostatic pressure force motivates said vehicle to which said structure is attached when said voltages are applied to said electrically conductive surfaces.

The electrostatic pressure force thruster for a vehicle of claim 21, wherein said net resulting electrostatic pressure force passes through said center of mass of said vehicle.

In an embodiment, the invention may comprise a method for generating a force on an object, comprising the steps of
  a. Providing an object having at least one electrically conductive surface; and
  b. Generating electrostatic pressure on at least one surface of said object by applying at least one voltage to the at least one conductive surface, said at least one voltage generating an electric field, said electric field giving rise to an electrostatic pressure acting on said at least one surface thereby generating a electrostatic pressure force on said at least one conductive surface, wherein said electrostatic pressure force acts on said object.

In an embodiment, the method of the invention may be further defined as the net resulting electrostatic pressure force being characterized as being the vector sum of all electrostatic pressure forces acting on said object.

In an embodiment, the at least one conductive surface may be further defined as two opposing conductive surfaces, and wherein said at least one voltage is further defined as a first voltage and a second voltage, said first and said second voltages are of different voltage value such that together they form an voltage difference, and wherein the first voltage is applied to said first conductive surface, and the second voltage is applied to the second conductive surface.

In an embodiment, a method of the invention may further comprise the step of using a computational method to determine the shape and geometric arrangement of the at least one conductive surface, and to determine the value of the at least one voltage, so as to achieve a desired net resulting electrostatic pressure force acting on said object, wherein the computational method comprises the steps of:
  a. defining a geometric arrangement of each of the electrically conductive surfaces;
  b. selecting an initial value for said at least one voltage;
  c. determining the resulting electric field intensity at each point along said electrically conductive surfaces;
  d. determining the resulting electrostatic pressure force acting on surfaces of said object;
  e. summing, in vector fashion, all resulting electrostatic pressure forces acting on each of said surfaces of said object to determine a computed total net resulting electrostatic pressure force acting on said object;
  f. comparing said computed total net resulting electrostatic pressure force to a desired net resulting electrostatic pressure force for acting on said object; and
  g. iteratively changing the geometric arrangement of each of the electrically conductive surfaces or the value of the at least one voltage and repeating steps c.-f. until the desired net resulting electrostatic pressure force acting on said object is achieved.

BRIEF DESCRIPTION OF THE DRAWINGS

The accompanying drawings, which are incorporated into and form a part of the specification, illustrate one or more embodiments of the present invention and, together with the description, serve to explain the principles of the invention. The drawings are only for the purpose of illustrating the preferred embodiments of the invention and are not to be construed as limiting the invention. In the drawings:

FIG. 9 depicts a side view of a non-limiting exemplary embodiment of a multi-stage electrostatic pressure force apparatus of the invention.

FIG. 21 depicts a perspective view of an exemplary test article used to prove the inventive concepts of the present invention.

FIG. 22 depicts a graphical depiction of the forces measured in a test article representing an embodiment of the invention.

FIGS. 23A and 23B depict a graphical representation of the forces measured on an epoxy field test article of an embodiment of the invention (FIG. 23A) and also provides a plot of the net resulting force for an embodiment of the invention is a function of and applied voltage difference (FIG. 23B).

FIG. 24 depicts a graphical representation of the electric field lines generated by an applied voltage difference that has been applied across electrodes of a multi-bladed embodiment of the invention, as determined by a computational method of the invention.

FIG. 25 depicts a graphical representation of a net resulting force generated by an electrostatic pressure force apparatus of the invention plotted as a function of spacing between electrodes, as determined by a computational method of the invention.

FIG. 26 depicts a side view of an embodiment of the invention in which the ground plane comprises at least one, and alternatively a plurality, of triangular protuberances.

FIG. 28 depicts a graphical representation of the net resulting force generated by an electrostatic pressure force apparatus of the invention as a function of gap distance, as determined by a computational method of the invention.

FIG. 29 depicts a composite view of three exemplary types of carbon nanotubes which may be used to form electrode surfaces of embodiments of the invention.

DETAILED DESCRIPTION OF THE INVENTION

Figure 1A:
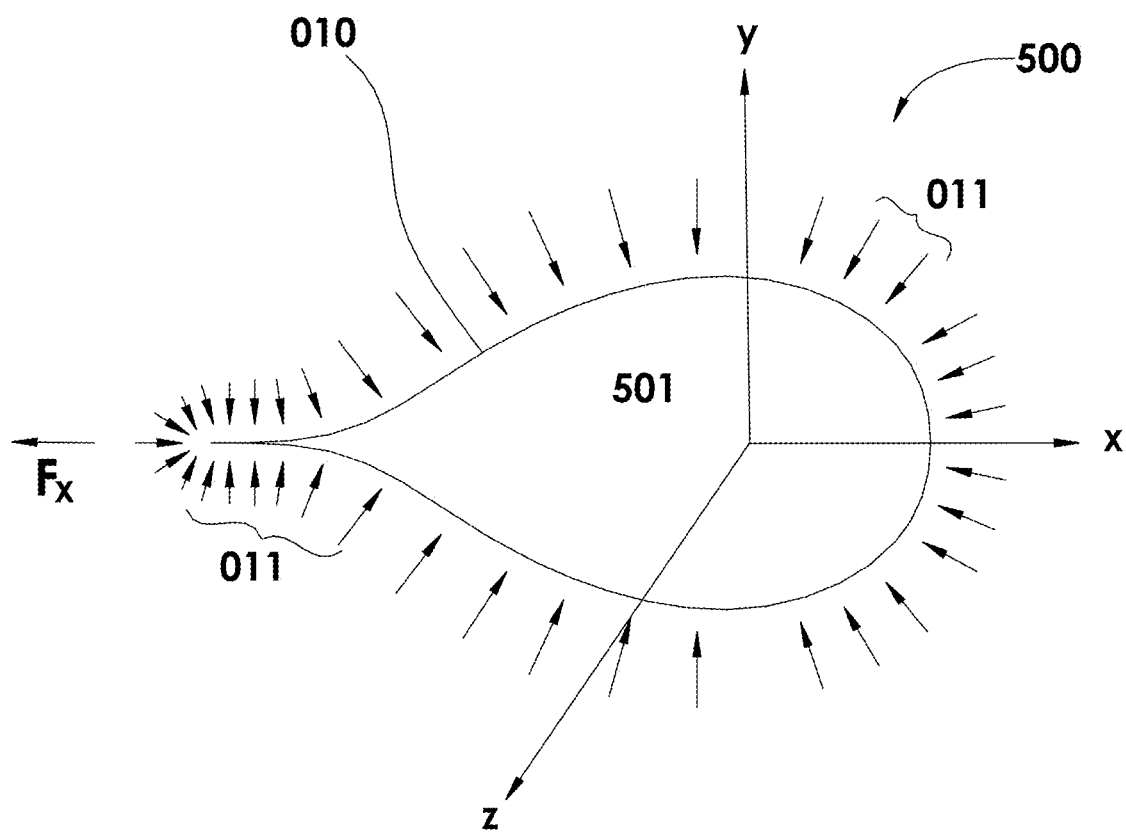
FIG. 1A depicts an exemplary, non-limiting embodiment of the invention comprising a single electrode.

The following documentation provides a detailed description of the invention.

Although a detailed description as provided in the attachments contains many specifics for the purposes of illustration, anyone of ordinary skill in the art will appreciate that many variations and alterations to the following details are within the scope of the invention. Accordingly, the following preferred embodiments of the invention are set forth without any loss of generality to, and without imposing limitations upon, the claimed invention. Thus the scope of the invention should be determined by the appended claims and their legal equivalents, and not merely by the preferred examples or embodiments given.

As used herein, when any two or more structures or elements are described as being "attached by non-electrically conductive means", or "attached by non-electrically conductive structure", these phrases include within their meaning any attaching structure or force, or any combination of attaching structures or forces, of any shape or comprised of any material or combination of materials, that attaches the two or more structures or elements, or affixes the spatial relationship between the structures or elements, without providing electrical conductivity between the two or more structures or elements. "Attached by a non-electrically conductive means" or "attached by non-electrically conductive structure" includes within their meaning, but are not limited to, a fixed attachment which does not allow the attached structures to translate or rotate relative to one other, and it includes within its meaning non-fixed attachment which may allow translation or rotation of the attached structures relative to one another. "Attached by non-electrically conductive means" or "attached by non-electrically conductive structure" also includes within their meaning the use of a force or forces to fix the spatial relationship of the structures or elements which are attached, such as, for example and not by way of limitation, the use of magnetic fields to hold electrodes of the invention in a specific spatial relationship. Thus, rotating attachment and sliding attachment are including within the meaning of "attached by a non-electrically conductive means" or "attached by non-electrically conductive structure". Thus, for example and not by way of limitation, the attaching structure or attaching structures may comprise a combination of electrically conductive and electrically non-conductive materials, or may comprise only non-conductive materials; may comprise a combination of structures or forces; may take any shape; or may comprises any combination of attaching structures or forces, or both, that fix or attach the two structures or elements relative to one another and does not provide electrical conductivity between the two structures or elements.

As used herein, "object" and "body" have the same meaning.

As used herein, "conductive" includes within its meaning "electrically conductive".

As used herein, "electrode" includes within its meaning an element comprising at least one electrically conductive surface.

As used herein, "geometric arrangement" includes within its meaning the size, orientation and geometric shape of the surfaces of an object and it also includes within its meaning the spatial orientation and distance relationship(s) between the surfaces of two or more objects, including the distance between surfaces of the two or more objects, i.e. between the surfaces of one object and the surfaces of another object, and the orientation of the two or more objects and, accordingly, their surfaces, in relation to a common coordinate axis system. In other words, as regards two or more objects, the geometric arrangement between the two or more objects defines the spatial relationship between the each of the surfaces of two or more objects as between the objects, and as regards a single object, the geometric arrangement of the surfaces of an object defines the spatial relationship between the surfaces of that object.

As used herein, "EPF" means electrostatic pressure force.

Theory of Operation of the Invention

In embodiments, the present invention may make use of Conservation of Energy for a center-of-mass (CM) system in which the total energy (kinetic plus potential) is zero. The kinetic energy of a system is comprised of an object with mass M, velocity v with potential energy U is written as:

$$0 = \tfrac{1}{2}Mv^2 + U \qquad (1)$$

What follows is a method to determine the conservation of momentum similar to the formalisms of Kirk McDonald [McDonald 2002] where one simply solves for momentum to give:

$$Mv = -\frac{2}{v}U \qquad (2)$$

Now we simply turn the velocity in the denominator of (2) into its operator $$v = \frac{dx}{dt}$$

to give $$Mv = -\frac{2Udt}{dx}. \qquad (3)$$

The next step is to note that d(Ut)=Udt+tdU and solving for Udt=d(Ut)−tdU. The differential of the product of energy and time is akin to the differential of the energy-time action integral S=∫L dt of the Lagrangian. Nature chooses the path of least action which is found by setting the differential to zero δS=δ∫Ldt=0. Here we make the claim that the differential of the energy-time product should also be set to zero d(Ut)=δ(Ut)=0 meaning $$Udt = -tdU \qquad (4)$$

Putting this back in to (3) becomes $$Mv = +2t\frac{dU}{dt} \quad (5)$$

There are other ways to derive this equation but it is well known that Force is the time rate of change of momentum and is also the spatial derivative of energy with distance.

The next step is to fill in the potential energy of the system. Conventionally one uses an external field as a source of the potential. However, we use a more generic form of energy, the energy stored in the field. In particular the energy stored in the electric field given by $$U = \frac{\varepsilon_o}{2} \int E^2 d\tau \quad (6)$$

a well-known equation. The placement of (6) into (5) along the x direction gives $$Mv = \varepsilon_o t \frac{d}{dx} \int \int \int E^2 dxdydz \quad (7)$$

$$= \varepsilon_o t d \left( \int \int E^2 dydz \right) \quad (8)$$

$$= \varepsilon_o t \Delta (E^2 A) \quad (9)$$

which can be written as $$P(t) = Mv = \varepsilon_o t [E_2^2 A_2 - E_1^2 A_1] \quad (10)$$

Equation (10) shows a linear time dependence on the momentum with a corresponding force of $$F = \frac{dP}{dt} = \varepsilon_o [E_2^2 A_2 - E_1^2 A_1] \quad (11)$$

if the electric field does not have a time dependence (electrostatic). Equation (11) is remarkable because it shows that a system (or object) can experience a net resulting electrostatic pressure force F if there are asymmetries in the electrostatic pressure experienced by (i.e. acting on) the surfaces of the object, for instance, such that the vector sum of the electrostatic pressure force acting on the surfaces of the system (or object) is non-zero. The determination of the electric field strength at any point along the surfaces of the system (or object), the resulting electrostatic pressure and electrostatic pressure force acting on the surfaces of the objected, and the net resulting electrostatic pressure force acting on the system (or object) as a function of the geometric arrangement of the surfaces of the object and the applied voltage or voltage differential giving rise to the electric field may be accomplished by computational methods. The $\varepsilon_o E^2$ relation is well known to science. It is the electrostatic pressure on the surface of an object. The permittivity of free space $\varepsilon_o$ is $8.85 \times 10^{-12}$ F/m and the maximum allowed electric field in air before breakdown is $\sim 10^6$ V/m. This gives an electrostatic pressure on the order of ~1 Pa or one Pascal. Since air is approximately 101.3 kPa, electrostatic pressure is about five orders of magnitude less. It is important to note that electrostatic pressure force is not the force or pressure due to Coulomb attraction on a surface. For example, if one surface is positive and the other surface is negative, there will be a strong Coulomb force of attraction between both surfaces which is on the order of $$\sim kq_1 q_2 / r^2 \text{ where } k = \frac{1}{4\pi\varepsilon_o} = 9 \times 10^9 \text{ Nm}^2\text{C}^{-2}.$$

Although the electric field is well defined in the region between the two surfaces and consists of a known direction, the direction of the electrostatic pressure force is not dependent upon the direction of the electric field; rather, it is a function of the square of the electric field. Thus, in the example in which the invention comprises a first electrode and a second opposing electrode, the two electrode surfaces will have a strong force of attraction due to the Coulomb coupling constant, but the electrostatic pressure between the two surfaces will push the two surfaces away from each other, albeit a much weaker force than the Coulomb force due to the electrostatic pressure force being linearly dependent on the free space permittivity constant while Coulomb's constant is inversely proportional to that same constant. Thus, in embodiments of the invention that comprise opposing electrodes, the electrodes comprising electrically conductive surfaces of the invention may be attached by a non-electrically conductive structure for in order to prevent them from collapsing together due to the Coulomb force. In embodiments, the structure for securing the electrodes may be non-conductive. In embodiments, the reactive force provided by the structure exactly equals the attractive Coulomb force tending cause the electrodes to come together, allowing the novel net electrostatic pressure force described below, which results from an asymmetry of electrostatic pressure forces acting on the electrodes, to be observed and to be utilized in an net electrostatic pressure force apparatus of the invention.

A novel inventive scheme of the invention makes use of electrostatic pressure force, which, in general, is the product of an electrostatic pressure and the surface area upon which the electrostatic pressure acts. In accordance with the above relationships, depending upon the geometric arrangement of the surfaces of an object and the intensity of an applied electric field, the surface or surfaces of an object may be subjected to differing levels of electrostatic pressure resulting from the applied electric field such that, when all electrostatic pressure forces acting on the surfaces of the object are vector summed, a net non-zero resulting electrostatic pressure force acts on the object. The value of the electrostatic pressure forces acting on the surfaces of the object may be determined by using computational methods to analyze differing geometric arrangements of the surfaces of the object, some of which may be electrically conductive and subjected to a voltage or voltage difference for generating the applied electric field, and differing levels of voltage or voltage difference applied to the electrically conductive surface or surfaces. A desired resulting net electrostatic pressure force may be produced by the inventive method steps disclosed and claimed herein, which steps include defining, in three dimensional space, the geometric arrangement of the electrically conductive surfaces of an object such that, when a predetermined voltage or voltage difference is applied to the electrically conductive surfaces of the object, a desired resulting net electrostatic pressure force is produced from the summation of the electrostatic pressure forces resulting from the electrostatic pressure acting on the surfaces of the object. The method of defining, in three dimensional space, the geometric arrangement of the electrically conductive surfaces of the object such that, when a predetermined voltage or voltage difference is applied to conductive surface(s) of the body, a desired resulting net electrostatic pressure force is produced from the vector sum of the electrostatic pressure forces resulting from the electrostatic pressure acting on the surfaces of the object can be done by computational means. Such computational means may, for example, run iterative computations, such as in a Monte Carlo analysis, varying the geometric arrangement of the electrically conductive surfaces and varying the applied voltage or voltage difference, until the desired net resulting electrostatic pressure force is achieved. Using the apparatus and method of the invention, it is possible to achieve a desired net resulting electrostatic pressure force acting on a body or object by determining the geometric arrangement of the conductive surfaces of the body or system such that the net electrostatic pressure force is maximized by maximizing the electrostatic pressure on one or more surfaces of the body or system, and by minimizing the electrostatic pressure on other surfaces of the body or system, such that a resulting net electrostatic pressure force is produced as the electrostatic pressure operates on the various surfaces of the object. Said another way, by creative manipulation of the conductive surfaces on one of the surfaces there may be created regions of lower electrostatic pressure which may be crafted into a surface that experiences lower electrostatic pressure, therefore having an imbalance of electrostatic pressure acting on it. The surface that has the least electrostatic pressure acting on its surface is subject to less electrostatic pressure force. This may be visualized as one surface making more thrust in a vector direction than the other surface does in the opposite vector direction. In embodiments, the resulting net electrostatic pressure force may be characterized as acting along an axis that is collinear with the net electrostatic pressure force vector. The direction of the net electrostatic pressure force may be determined by computational techniques known in the art for determining the electrostatic pressure resulting from an electric field acting on surfaces of the object.

Differentiation from Other Theories of Operation

The present invention does not require the use of an ion wind to generate the force. Interestingly, if ion wind is generated using geometries describe herein, the electrostatic pressure force is in the same direction of the wind. [Imagine a rocket moving in the direction of its exhaust]. In embodiments, the invention may be encapsulated in an enclosure to remove ion wind effects. The proof of concept and reduction to practice tests mentioned herein were generally performed within an enclosed box to nullify ion wind effects.

Force measurements are performed on the box itself which removes all doubt that the forces observed are contained within the box and not due to outside effects such as ion wind and Coulomb attraction to exterior surfaces (walls, chambers, etc.). The Coulombic attraction to other surfaces is prevented by sufficiently grounding the test chamber box.

Many of the measurements performed on the test devices described herein make use of direct current (DC), or non-time-varying applied voltages, which eliminates magnetic effects. Magnetic effects are well known to occur if a system uses strong currents which can interact with the Earth's magnetic field via Lorentz Law forces, resulting in unwanted forces and torques on that system. Magnetic fields can also be generated by constant currents (Ampere's Law) or changing electric fields (Faraday's Law) which can interact with the Earth's magnetic field as well. The present invention has proven to work in DC, i.e. non-time-varying voltage, mode which eradicates all magnetic components for explaining the phenomenon.

Without the presence of a magnetic field, the present invention does not generate field momentum. Classical electrodynamic fields possess momentum, as was first realized by Poynting [1884] and discovered independently by Heaviside [1885], who found that a finite cross-product of E×B is proportional to a momentum density. The fact that this momentum occurs for every frequency including zero frequency, as in the case of static fields, has troubled scientists since the beginning of the formulation of electrodynamics and has only recently been widely accepted and appreciated. The notion that fields carry momentum similar to the way in which particles do has led scientists to resolve paradoxes that question whether electrodynamics obeys Newton's laws. One famous example involves two charged particles moving at right angles towards one another. The electrical force between them is repulsive but the magnetic force is not equal and opposite [Page and Adams, 1945]. This seems to violate Newton's third law. Only when the field momentum of the charges is taken into account does the conservation-of-momentum laws hold.

It is possible to use angular field momentum to impart mechanical momentum onto a system. The famous Feynman disk paradox shows how stored angular field momentum can be converted into mechanical rotational momentum [Feynman 1965]. This has been verified experimentally by Graham and Lahoz [1980]. As a result of the insight provided by Dr. Feynman many researchers have proposed the use of linear field momentum as a tool for propellentless propulsion. The idea first arose more than 50 years ago when Dr. Joseph Slepian theorized that a craft can be propelled by "a means of propulsion which does not require any material medium upon which the propelling thrust is exerted" [Slepian 1949]. Work continues into the $21^{st}$ century to investigate the possibility that field momentum (E×B) could provide forces on objects without expelling propellants [Corum, et al. 2001]. The Electromagnetic Momentum Generator (EMMG) developed by Brito [Brito 1999, 2001 and 2003] is a toroid geometry used to generate field momentum in the x-direction that supposedly generates a very small mechanical force in that direction. It uses a parallel-plate ring configuration to generate the electric field in the radial direction encompassed by a current-carrying coil to create the circumferential magnetic field. Their belief was that having the field momentum present itself was enough to generate a force.

However, the consensus of NASA's Breakthrough Propulsion Project (BPP) in 2003 was to independently verify any net thrust claim in the area of field momentum, a task given to the Astronautics department at the United States Air Force Academy. Experiments by Bulmer and Lawrence [2003] aimed to monitor any change in the momentum of a laser beam as it passed through a volume containing linear field momentum. A laser beam was placed within this volume parallel to the electrodes whose DC offset was monitored. The belief was that any change in the DC offset would suggest an acceleration of space where the field momentum existed. However none was ever detected.

Although there are many researchers trying to use field momentum as a means to produce a linear force as an analog to the Feynman disk, none have been successful. This is most likely as a result of not addressing the hidden momentum.

The invention is not subject to the recently discovered "hidden momentum", a momentum commonly used to cancel field momentum. This additional momentum, which is a relativistic effect, derives from internal stresses of the system, was not formally introduced until 1967 by Shockley and James [1967]. They considered a system of two counter-rotating oppositely charged flat disks in the presence of the field of a charged particle. As the disks slow, the changing electric field creates a magnetic field that acts on both the particle and the disks. This appears to give the system a total net force, thus requiring an internal equal and opposite force if the system is to remain stationary. This paradox was resolved a year later by Coleman and Van Vleck [1968], who used the Darwin Lagrangian to solve for the equations of motion (a more complete discussion was provided by Furry [1969]). They found that the electric field of the charged test particle does exhibit a force on the magnet due to relativistic effects. This can be explained using a simple model developed by Haus and Penfield [1968].

The hidden momentum is a relativistic effect that only applies to moving charge carriers. For example, it is the hidden momentum that balances any static field momentum in the case of either current loops or magnetic dipoles (which are represented as small current loops) in the presence of external electric fields. It does not apply to divergent currents. The concept of hidden momentum has helped scientists recover momentum conservation for several cases, including the explanation of the Aharonov-Bohm effect [Aharonov et al., 1987] for the behavior of neutrons in the presence of static fields and magnetic dipoles in the presence of electric fields [see Griffiths 1992; Hnizdo 1991; Lawson 1982].

In short, the invention does not operate on a theory of ion wind, Coulomb attraction to walls, interactions with the Earth's magnetic field, field momentum or hidden momentum. The technology of the present invention is not the result of the changing mass such as the Mach Effect nor is it related to some effects related to the quantum vacuum fluctuations as theorized by the makers of the EM Drive.

Exemplary Embodiments of the Invention

Figure 1B:
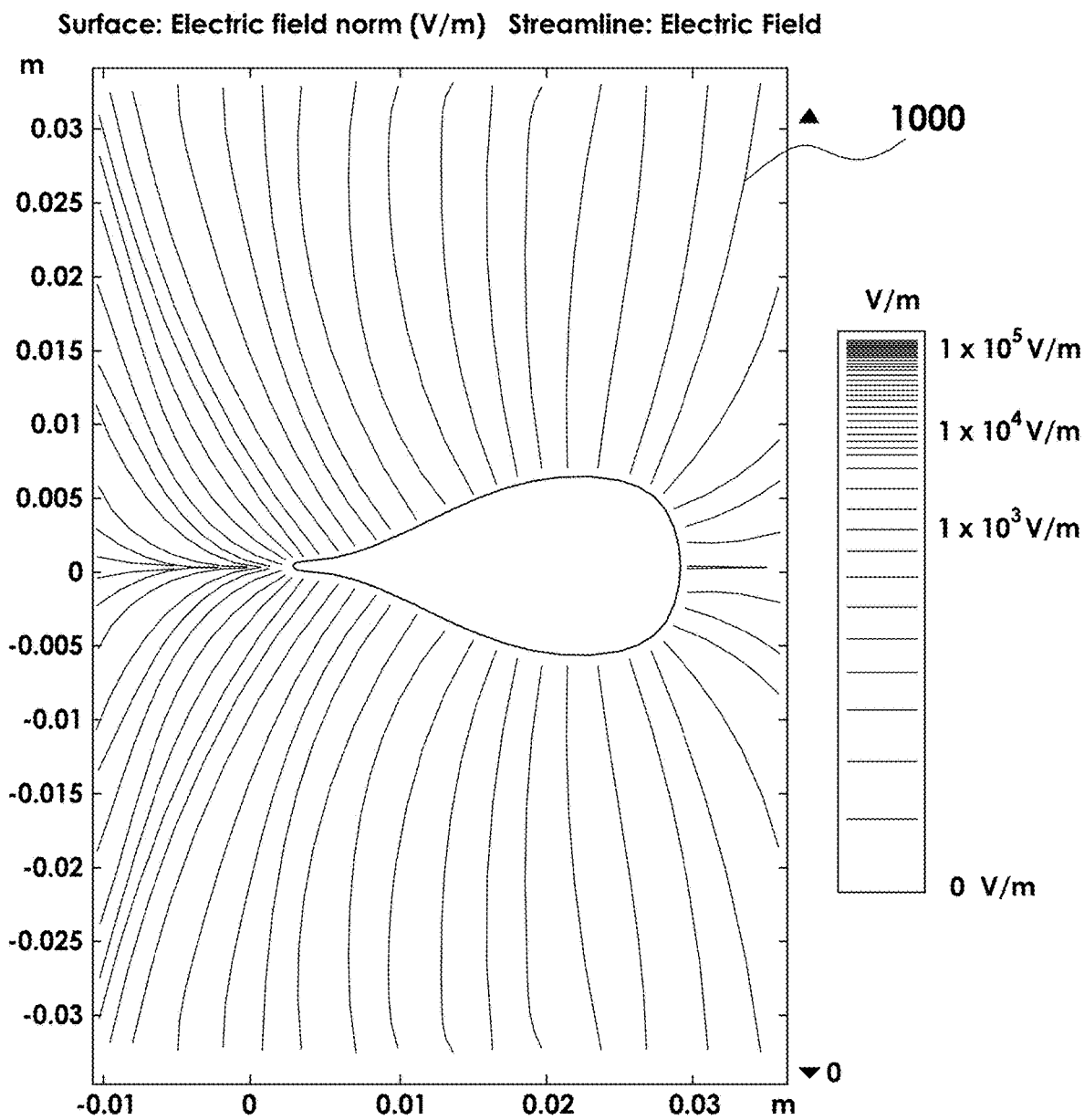
FIG. 1B depicts an electric field, depicted by field electric lines 1000, generated by the application of a voltage to the electrically conductive surfaces of the exemplary, non-limiting embodiment of the invention depicted in FIG. 1A.

Referring now to FIGS. 1A and 1B, a non-limiting, exemplary embodiment of the invention comprising a single electrode is depicted. An object 500, which comprises an electrically conductive surface or plurality of surfaces 501 is provided with a voltage such that electrically conductive surface or plurality of surfaces 501 is maintained at that voltage. The application of the voltage to the electrically conductive surface or plurality of surfaces 501 cause an electric field to be formed around body 500 as shown in FIG. 1B, creating electrostatic pressure on the surface or plurality of surfaces 501, resulting in electrostatic pressure 011 on surface or plurality of surfaces 501. When the three dimensional shape of object 500 is determined, by the use of computational techniques, to be of non-uniform cross section in any direction (in the exemplary embodiment shown, along the x axis), the summation of the electrostatic pressure forces acting on surface or plurality of surfaces 501 in such direction will be non-zero, i.e. will result in net resulting electrostatic pressure force $F_x$ acting on object 500. If the net resulting electrostatic pressure force $F_x$ is not opposed by any other force, body 500 will be accelerated in the direction of net resulting electrostatic pressure force $F_x$. In the embodiment depicted in FIGS. 1A and 1B, the electrically conductive surface or plurality of surfaces 501 form the single electrode of the invention. If object 500 is in contact with or forms a part of another structure along the axis of the net resulting electrostatic pressure force $F_x$, object 500 will act on that structure with force $F_x$. The electric field is depicted by field electric lines 1000.

Figure 2:
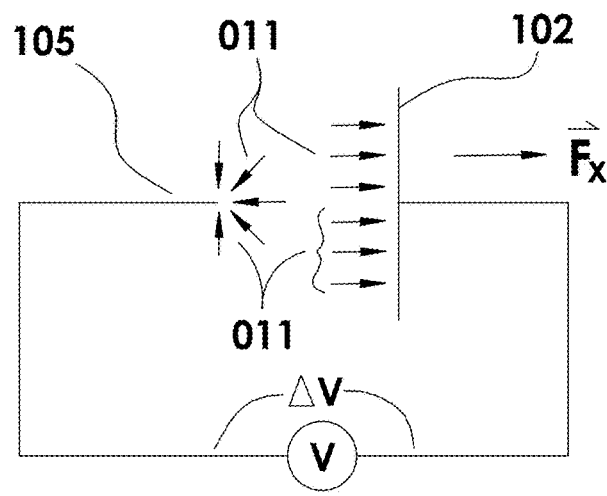
FIG. 2 depicts an exemplary, non-limiting embodiment of the invention comprising two electrodes, each electrode having electrically at least one electrically conductive surface, in which the electrically conductive surfaces of the electrodes are opposing, and which the first electrode has proximal and distal electrically conductive surfaces.

Referring now FIG. 2, a non-limiting, exemplary embodiment of the invention comprising two electrodes is depicted. In this embodiment, an object may comprise first electrode 101 is an electrically conductive wire, and second electrode 102 is shown as a plate comprising electrically conductive surfaces, but may take any shape determined by computational techniques as described herein to define a geometric arrangement of first electrode 101 and second electrode 102, and to define an applied voltage difference $\Delta V$, to produce a desired net resulting electrostatic pressure force $F_x$. Voltage difference $\Delta V$ may be applied between first electrode 105 and second electrode 102 by, for example, a wire, creating an electric field that in turn results in electrostatic pressure forces 011 acting on first electrode 105 and second electrode 102. First electrode 105 and second electrode 102 may be attached by non-electrically conductive means 103 that does not provide electrical conductivity between first electrode 105 and second electrode 102. A net resulting electrostatic pressure force $F_x$, which is the vector sum of all electrostatic pressure forces acting on the object, will act on the structure consisting of structure 103, first electrode 105 and second electrode 102.

Figure 3:
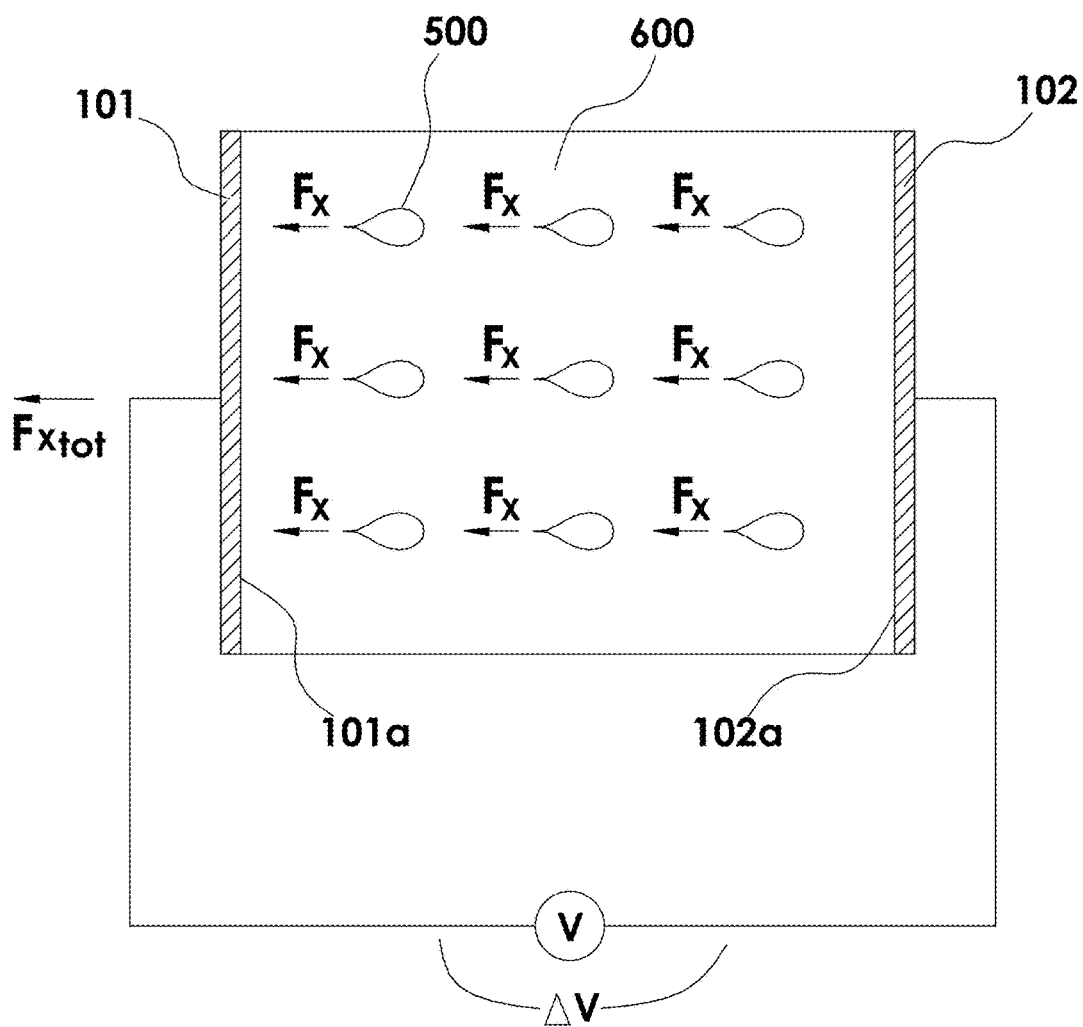
FIG. 3 depicts a side view of an exemplary, non-limiting embodiment of the invention in form of an object comprising a plurality of electrodes, that are not connected with one another via an electrically conductive medium, suspended between an outer electrode pair, where the outer electrode pair comprises a first electrode 101 and a second electrode 102, in which a voltage difference is applied across the first electrode and the second electrode, creating an electric field between them, and thereby causing x-axis oriented asymmetrical electrostatic pressure force to develop on each electrode. The-axis oriented asymmetrical electrostatic pressure force on each electrode vector sums to a net resulting electrostatic pressure force on the object.
Figure 4:
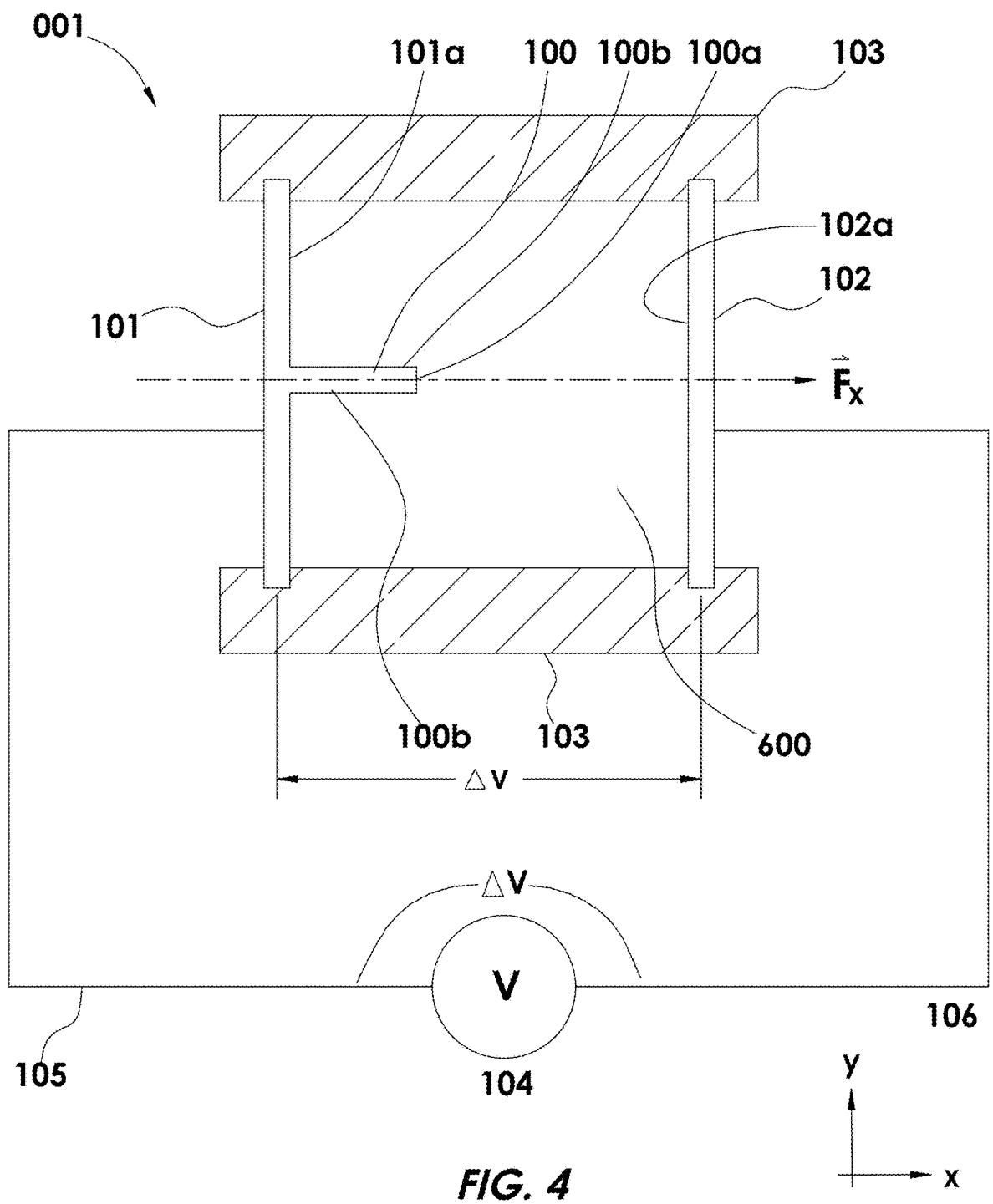
FIG. 4 depicts a top view of a non-limiting exemplary embodiment of a single-stage electrostatic pressure force apparatus of the invention comprising first and second opposing electrically conductive surfaces, in which the first electrically conductive surface further comprises a blade configuration.
Figure 5:
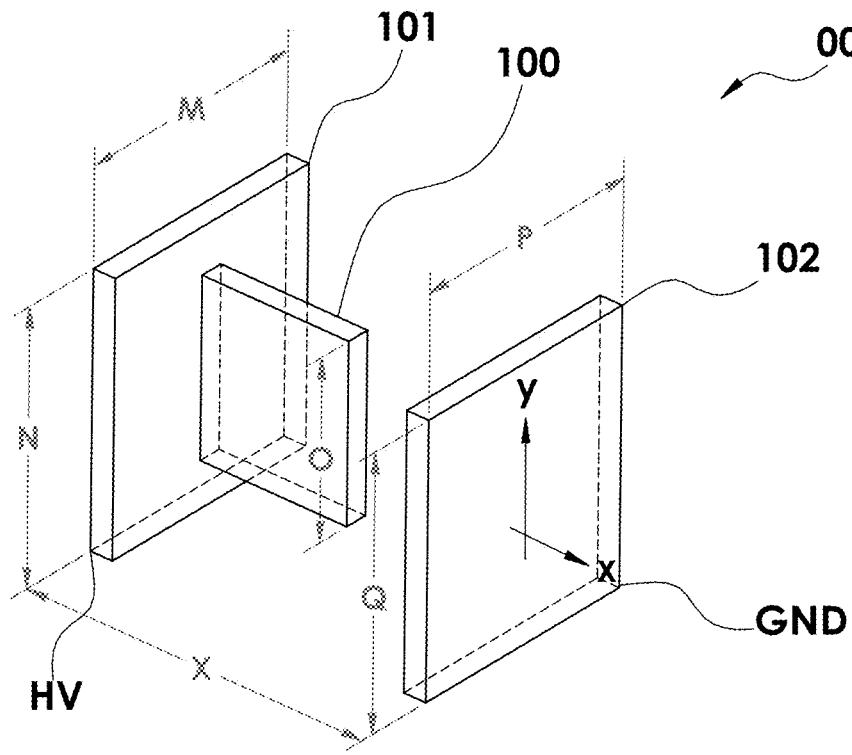
FIG. 5 depicts a perspective view of a non-limiting exemplary embodiment of a single-stage electrostatic pressure force apparatus of the invention comprising first and second opposing electrically conductive surfaces, showing parameters of the geometric arrangement of the electrically conductive surfaces.

Referring now to FIG. 3, a non-limiting, exemplary embodiment of the invention comprising a plurality of electrodes suspended between a pair of electrodes is depicted. In this embodiment, a plurality of electrodes, such as electrode 500 depicted in FIG. 1, may be dispersed, or suspended, between a first electrode 101 and a second electrode 102. A voltage difference $\Delta V$ may be applied across first electrode 101 and second electrode 102, creating an electric field that causes electric polarization of electrodes 500, resulting in electrostatic pressure forces $F_x$ acting on each of electrodes 500 such that each electrode 500 is acted on by a net resulting electrostatic pressure force $F_x$ as described herein relative to FIG. 1. The summation of these net resulting electrostatic pressure forces $F_x$ acting on each electrode 500 results in a total net resulting electrostatic pressure force $F_x$tot acting on object 001. In such embodiments, it is not necessary that each of electrodes 500 be similar in shape or size. Using the computational techniques as described herein, a user may utilize any shapes for electrodes 500 that will result in net resulting electrostatic pressure forces $F_x$ as may be desired, for example, to achieve a desired $F_x$tot.

Referring now to FIGS. 4-8, a non-limiting, exemplary, single-stage embodiment of an electrostatic pressure force apparatus of the invention is depicted. The embodiment depicted in FIGS. 4-8 is one of many embodiments that comprise the inventive schemes of the invention, and thus the single-stage embodiment of the invention depicted in FIGS. 4-8 is merely one physical embodiment of many physical embodiments of the invention. In the exemplary embodiment of the electrostatic pressure force apparatus depicted in FIG. 4, the invention may comprise at least one set of opposing first and second electrodes 101 and 102, respectively. First electrode 101 may have electrically conductive surfaces 101a and 100a that each oppose an electrically conductive surface 102a of a second electrode 102. Electrodes 101 and 102, and their opposing electrically conductive surfaces 101a, 100a and 102a, may comprise materials such that the electrodes and their surfaces are continuously conductive throughout, such as, for example, may be the case in which electrodes 101 and 102 are each fabricated from a homogenous piece of electrically conductive material; or, either or both of first electrode 101 and second electrode 102 and their opposing surfaces 101a, 100a and 102a may be discontinuously electrically conductive, such as, for example, in an embodiment in which either one, or both, of first electrode 101 and second electrode 102 are fabricated from a plurality of materials, some of which may be electrically non-conductive. Electrode 101 may comprise at least one proximal surface 100a which may be electrically conductive and at least one distal surface 101a which may be electrically conductive, each of surface 101a and 101a opposing electrically conductive surface 102a of electrode 102, wherein proximal surface 100a may be disposed in closer proximity to second electrode surface 102a than distal surface 101a. At least one proximal surface 100a may be connected to, and in electrical communication with, at least one distal surface 101a by electrically conductive surface 100b. Electrodes 101 and 102, and thus their opposing surfaces 101a and 102a, and 100a and 102a, may be attached in any manner, such as fixedly attached, by any non-electrically conductive means, represented in FIG. 4 by element 103 which is merely an exemplary shape of a non-electrically conductive means for fixedly attaching electrode opposing surfaces 101a, 100a and 102a. The exemplary structure comprising electrode 101, and electrode 102, and non-electrically conductive attaching means 103 as depicted in FIGS. 4-8 may be herein referred to as a single-stage embodiment of the invention. It is understood that the physical embodiment shown in the figures of this single stage embodiment is not limiting but is rather exemplary, and that any physical configuration of devices or structures that comprise the essential elements of the invention are within the scope and breadth of the claimed invention.

Figure 6A:
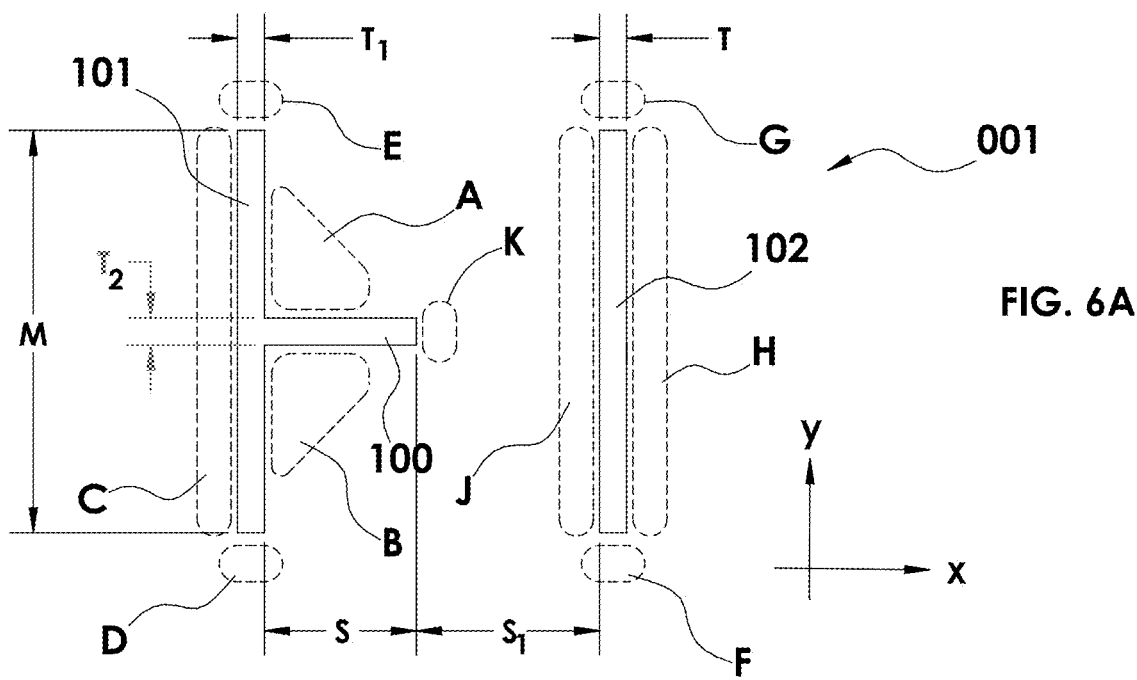
FIG. 6A depicts a schematic top view of a non-limiting exemplary embodiment of a single-stage electrostatic pressure force apparatus of the invention, in which various aspects of the electric field intensity are depicted.
Figure 6B:
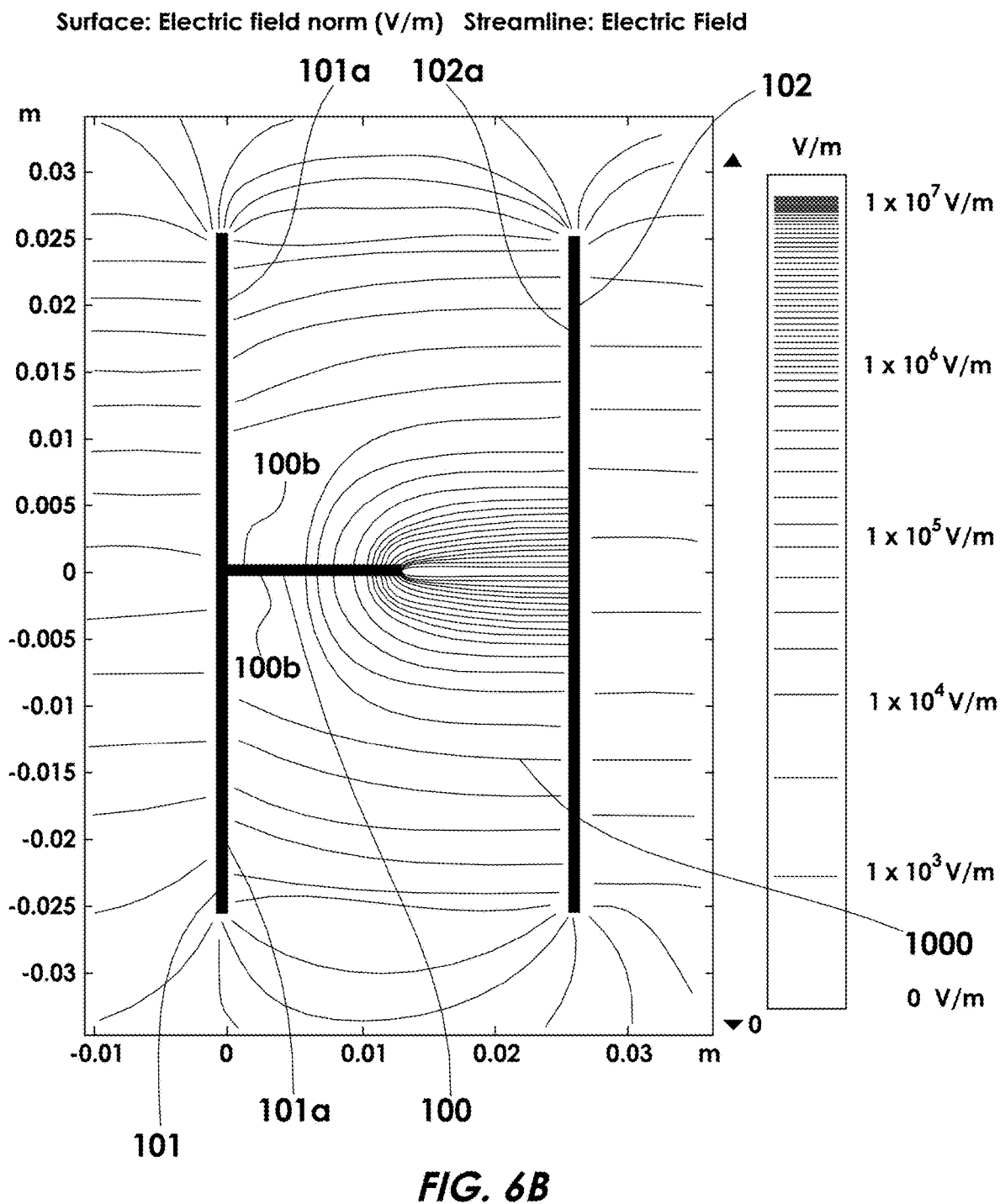
FIG. 6B depicts a plot of the electric field, depicted by field electric lines 1000, as seen from the top, for the non-limiting exemplary embodiment of a single-stage electrostatic pressure force apparatus of the invention shown in FIGS. 4, 5 and 6A.

Still referring to FIGS. 4-8, an applied voltage difference ΔV between first shaped electrode surfaces 101a and 100a and said second shaped electrode surface 102a, causes an electric field, which may be non-uniform or non-homogeneous, to be generated between first shaped electrode surfaces 101a and 100a and second shaped electrode surface 102a (see FIG. 6). The electric field, which is depicted by the field lines of FIG. 6B, has regions of differing magnitude as depicted in order of ascending intensity by regions A and B, C, H, J and D/E/F/G in FIG. 3. The local intensity, direction and shape of the electric field is a function of the intensity, polarity and time-varying characteristics (if any) of the applied voltage difference ΔV between first electrode surfaces 101a, 100a and second electrode surface 102a, and, for the exemplary embodiment shown in FIGS. 4-8, the geometric arrangement of shaped electrode surfaces 101a, 100a and 100b and said second shaped electrode surface 102a and the geometry of the separation between shaped electrode surfaces 101a and 100a and said second electrode surface 102a as given by T, T1, T2, M, N, O, P, Q, S, $S_1$, U, and V (see FIGS. 2 and 3).

It is a feature of the claimed invention, in any embodiment, that the geometric arrangement of the surfaces off the object, and the applied voltage or voltage difference, may be determined by a user using, for example, the computational methods of the invention, in order to achieve a desired resulting net electrostatic pressure force $F_x$ as described herein, and that, as such, the scope of the invention is not limited by the depictions of the figures or the use cases described herein, which are all merely exemplary in nature.

Figures 7, 8:
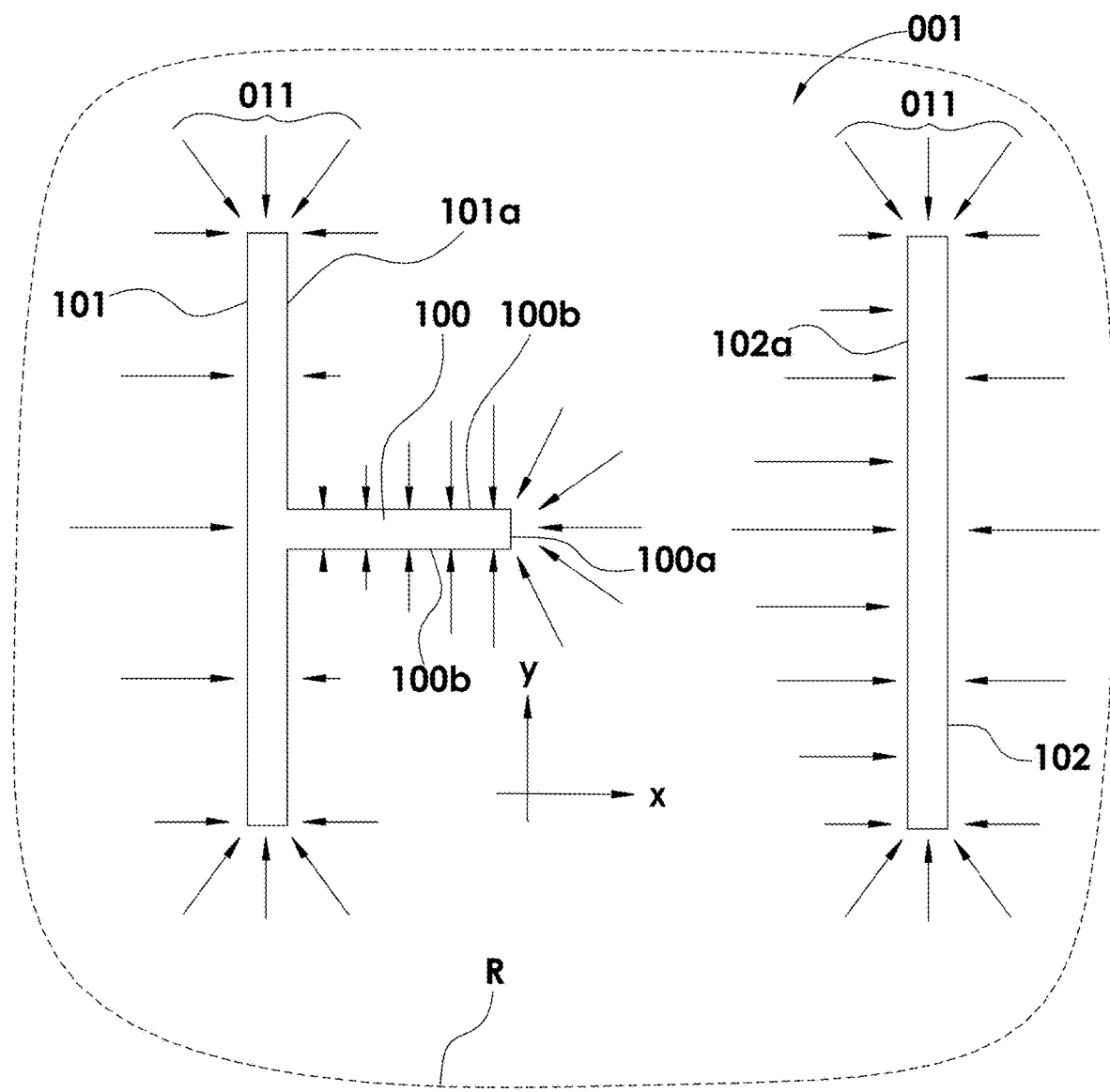
FIG. 7 depicts a schematic top view of a non-limiting exemplary embodiment of a single-stage electrostatic pressure force apparatus of the invention, in which various aspects of electrostatic pressure forces caused by the electric field are depicted.
FIG. 8 depicts a coordinate axis for reference in all the figures of the drawings.
Figure 10:
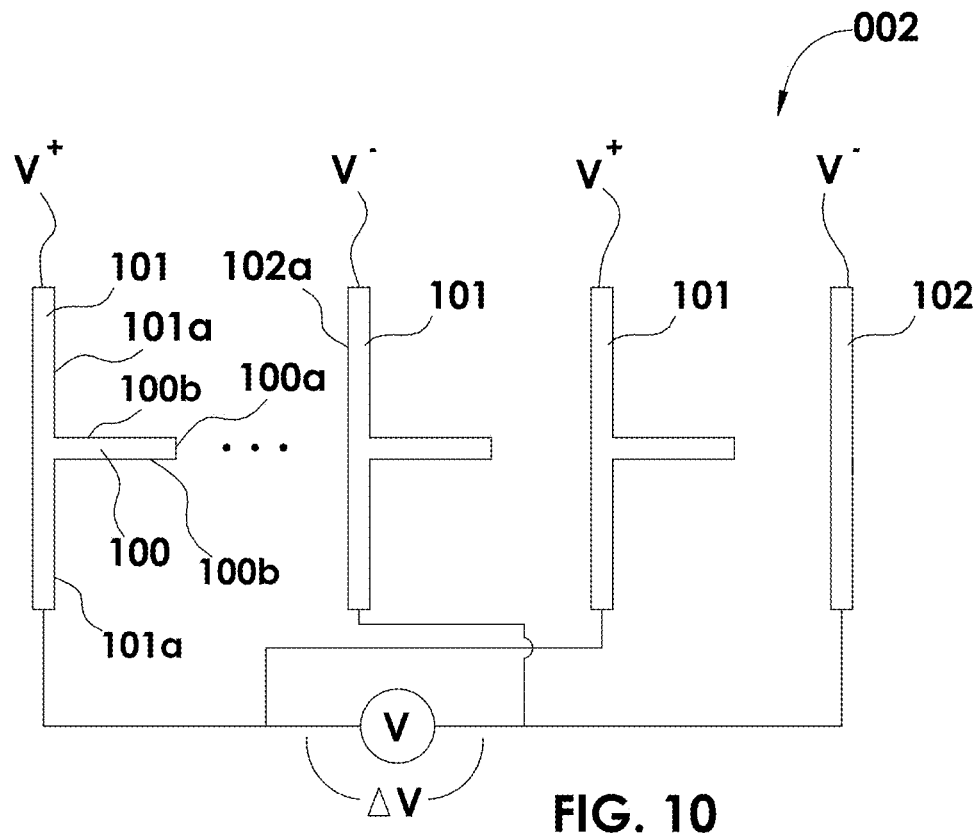
FIG. 10 depicts a side view of a non-limiting exemplary embodiment of a multi-stage electrostatic pressure force apparatus of the invention, in which the polarity of the applied voltage differential is shown, is may be the case in some embodiments, as alternating between stages.
Figure 11:
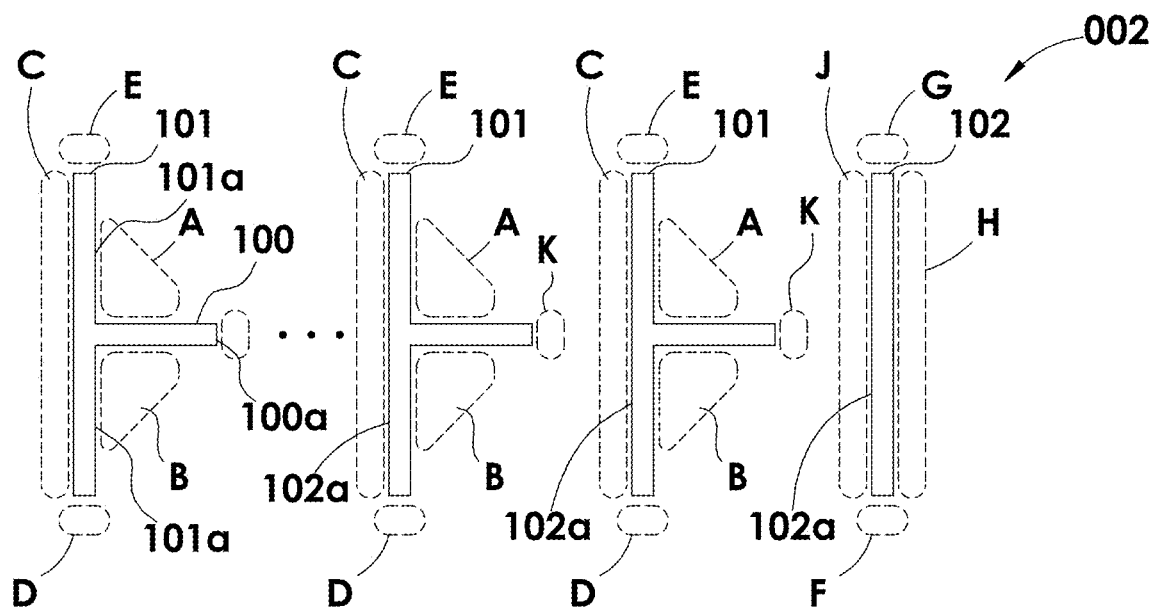
FIG. 11 depicts a schematic side view of a non-limiting exemplary embodiment of a multi-stage electrostatic pressure force apparatus of the invention, in which various aspects of the electric field intensity are depicted.
Figure 12:
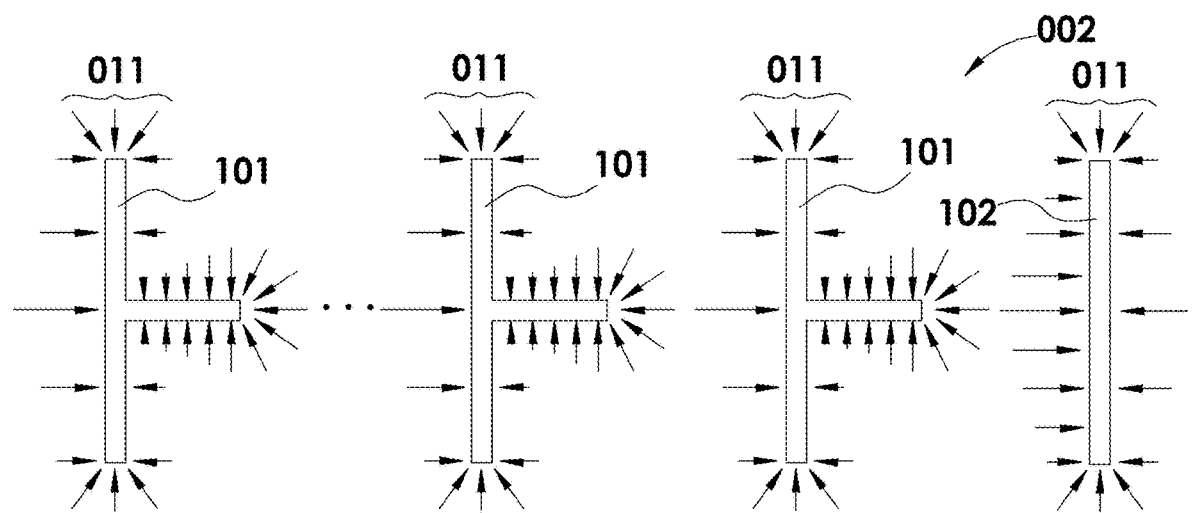
FIG. 12 depicts a schematic side view of a non-limiting exemplary embodiment of a multi-stage electrostatic pressure force apparatus of the invention, in which various aspects of electrostatic pressure forces caused by the electric field are depicted.
Figure 13:
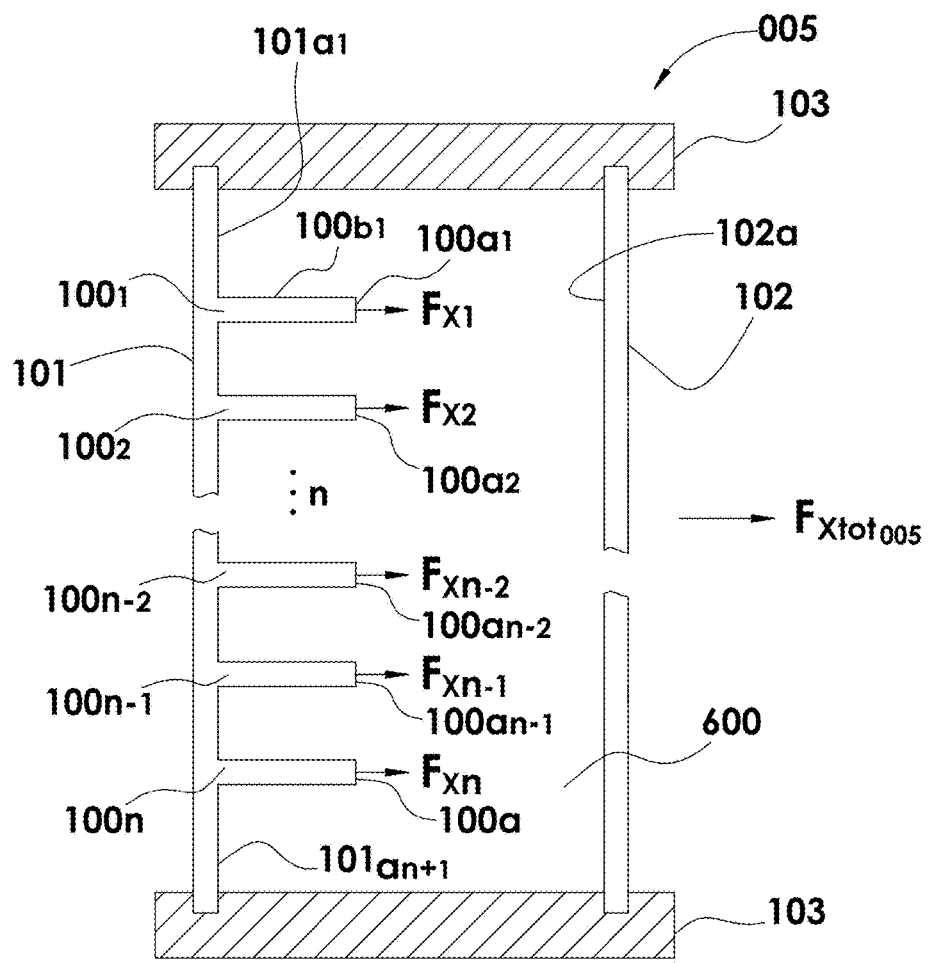
FIG. 13 depicts a side view of a non-limiting exemplary embodiment of a single-stage electrostatic pressure force apparatus of the invention that comprises a plurality of proximal surfaces.
Figure 14:
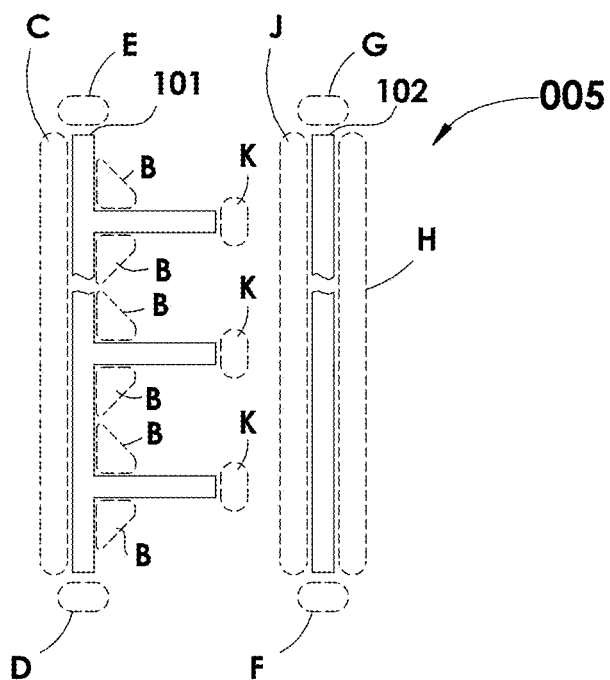
FIG. 14 depicts a side view of a non-limiting exemplary embodiment of a single-stage electrostatic pressure force apparatus of the invention that comprises a plurality of proximal surfaces, in which various aspects of the electric field intensity are depicted.
Figure 15:
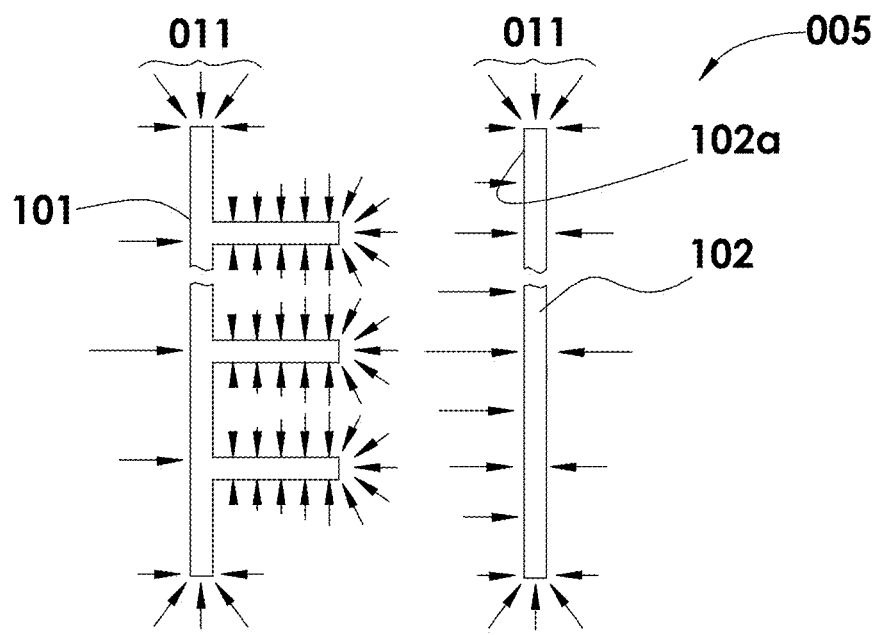
FIG. 15 depicts a side view of a non-limiting exemplary embodiment of a single-stage electrostatic pressure force apparatus of the invention that comprises a plurality of proximal surfaces, in which various aspects of electrostatic pressure forces caused by the electric field are depicted.
Figure 16:
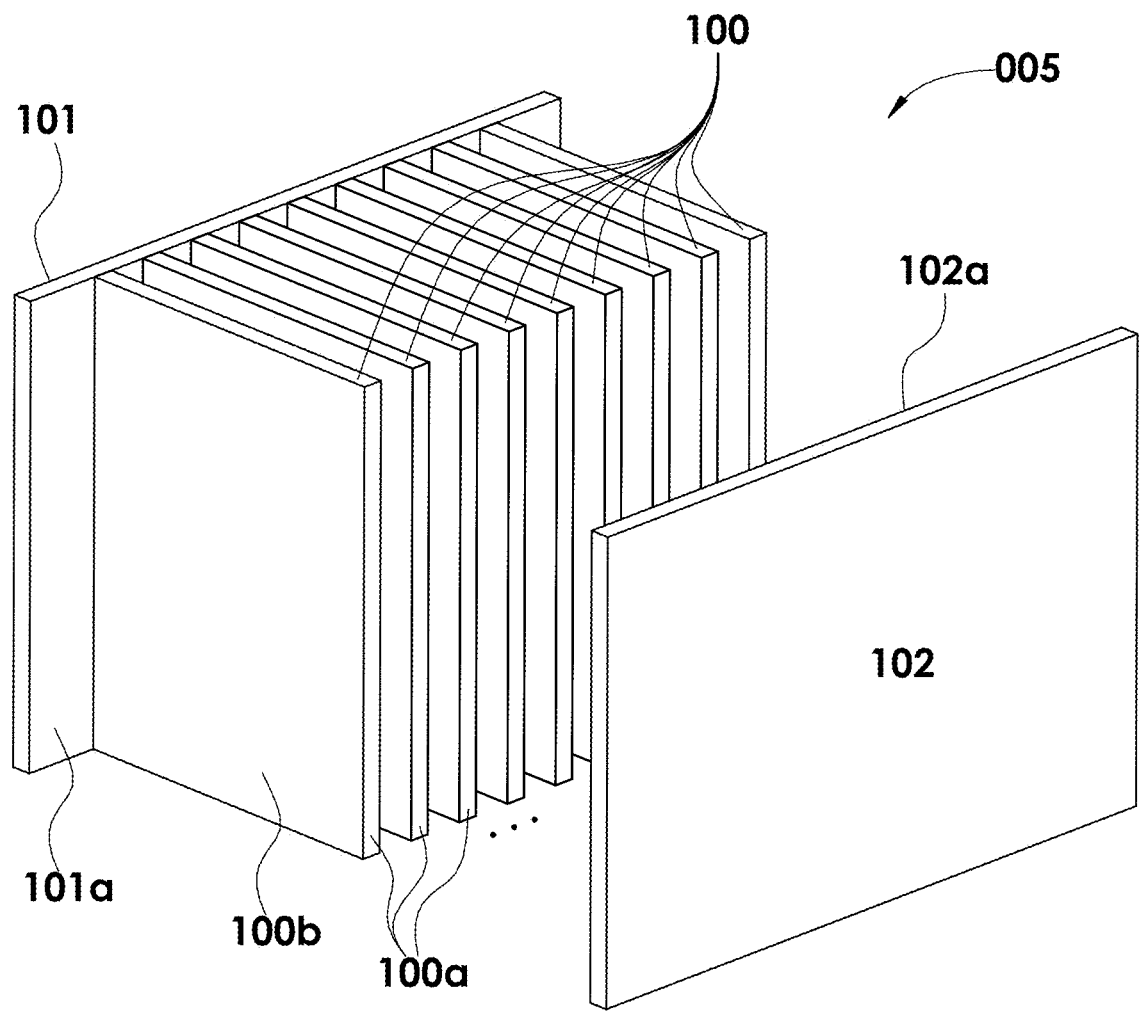
FIG. 16 depicts a perspective view of a non-limiting exemplary embodiment of a single-stage electrostatic pressure force apparatus of the invention that comprises a plurality of proximal surfaces that was built and tested as an exemplary test article.

Still referring to FIGS. 4-8, and specifically referring to FIG. 8, the non-homogeneous electric field results in electrostatic pressure forces as depicted by the arrows shown, in accordance with the theory presented herein, resulting an electrostatic pressure tending to separate electrode surfaces 101a and 102a and 100a and 102a, and, as a result, tending to separate electrodes 101 and 102. It is a feature of the invention, in all embodiments, that the shape and geometry of electrode surfaces 101a, 100a and 102a, and the separation between them, may be determined by a user such that the electrostatic pressures caused by the electric field arising from the applied voltage difference ΔV between first electrode surfaces 101a and 100a and second electrode surface 102a results in a net imbalance of electrostatic pressure forces (see FIG. 4) acting in the x direction, as shown in the figures, between the first electrode surfaces 101a and 100a and the second electrode surface 102a. Because this net imbalance of electrostatic pressure forces exists in the x direction, and because electrodes 101 and 102 are attached, which may be a fixed attachment, through structure or forces 103, a resulting net electrostatic pressure force $F_x$ having a vector is applied to attached elements 101, 102 and 103. If attached elements 101, 102 and 103 are disposed in an environment such that the sum of the magnitude of any environmental forces opposing the resulting net electrostatic pressure force $F_x$ is less than the magnitude of resulting net electrostatic pressure force $F_x$, translation of attached elements 101, 102 and 103 in the direction of the vector of resulting net electrostatic pressure force $F_x$ will occur. The acceleration of fixedly attached elements 101, 102 and 103, and any structure to which they are attached, is given by the momentum relation F=ma, where "F" is the vector sum of Fx and all opposing forces, "m" is the total mass of the elements 101, 102 and 103, and any structure to which they are attached, and "a" is the acceleration of elements 101, 102 and 103, and any structure to which they are attached. With regard to the y direction, for the embodiment show, the forces on the structure created by 101, 102, and 103 in the y direction may, but do not necessarily, cancel out, resulting in no net force with a y direction component. However, it may be desirable that forces in the y direction not cancel, and, in such cases, electrodes 101 and 102 may be shaped as described herein in order to provide a non-net-zero force in the y direction.

In any embodiment of the invention, a voltage V+ or V− may be established on electrode surface 102a and a voltage V+ or V− may be established on electrode surfaces 101a and 100a such that there is a voltage difference applied ΔV between electrode surfaces 101a and electrode surface 102a, and there is a voltage difference ΔV applied between electrode surfaces 100a and electrode surface 102a. Electrode surfaces 100a and 101a may be at the same voltage. A specific separation distance X is established between electrode 101 and electrode 102, and an electric field gradient is created. By this physical geometry and the application of electrical potential difference ΔV to the electrode surfaces, regions of high electrostatic field intensity D, E, F and G and low electrostatic field intensity A and B are created in conformance with the afore described electrostatic theory. Examples of these regions may be, in ascending order of intensity, A and B, C, H, J and D/E/F/G as shown in FIG. 6. Electrostatic pressure over an area is computed as the product of each region of electrostatic field intensity multiplied by the area over which it occurs. When ΔV applied across the electrode surfaces as herein described, electrostatic pressure vectors as depicted in FIG. 7 result. These electrostatic pressure vectors may be summed along all three axes as defined in FIG. 8. It is an inventive scheme of the present invention that the physical shapes of the various conductive elements, i.e. electrode surfaces, and the physical and geometric relationships between the electrode surfaces can be adapted to optimize the regions of higher electrostatic pressure and lower electrostatic pressure being asserted on the electrode surfaces, thereby optimizing the summation of forces acting on any embodiment of the invention. It is this optimization of shape and form of the core electrode surfaces, the application of electrical potential difference $\Delta V$ to the electrode surfaces and the resulting non-homogeneous electric field, yielding predicted vector summations of electrostatic pressures acting over predictable surface areas to achieve a desired resulting net force F, which resulting net force F is not a result of ion wind, Coulomb attraction to walls, interactions with the Earth's magnetic field, field momentum or hidden momentum; that is a novel aspect and inventive scheme of the present invention.

As an example of but one of numerous use cases of the invention, if elements 101, 102 and 103 are attached to a spacecraft structure in a vacuum or near vacuum environment, acceleration of the spacecraft will occur when $\Delta V$ is applied to electrodes 101 and 102 as herein described. If the resulting net electrostatic pressure force $F_x$ is applied on a vector passing through the center of mass of the spacecraft, translation of the spacecraft without rotation will occur. If the resulting net electrostatic pressure force $F_x$ is applied on a vector that does not pass through the center at the center of mass of the spacecraft, both rotation and translation of the spacecraft will occur. Thus the electrostatic pressure force apparatus of the invention, when used as means for motivating an object, may be described as an electrostatic pressure force thruster.

Still referring to FIGS. 4-8, the applied voltage difference $\Delta V$ may be applied by any electrical source 104 which may produce a non-time-varying or time-varying voltage difference $\Delta V$. Thus the voltage difference $\Delta V$ applied to electrodes 101 and 102 may be, or may not be, time-varying. The polarity of applied voltage difference $\Delta V$ may be any polarity; i.e. the resulting vector of resulting net electrostatic pressure force $F_x$ is not affected by the polarity of applied voltage difference $\Delta V$, because the net electrostatic pressure force $F_x$ is a function of the square of the electric field and is thus independent of the polarity of the applied voltage difference $\Delta V$. The direction of the net electrostatic pressure force $F_x$ is a function of the shape of first electrode surfaces 101a and 100a and the second electrode surface 102a as described herein. The electric field is depicted in FIG. 6B by field electric lines 1000.

Still referring to FIGS. 4-8, an optional dielectric material 600 may be disposed between electrodes 101 and 102 in order to prevent breakdown at higher applied voltage differences. The use of optional dielectric material 600 may be beneficial for specific use cases. Dielectric material 600 may be any dielectric material. In general, any embodiment of the invention comprising more than one electrically conductive surface, or which employs a voltage difference to develop the electric field, may, but do not necessarily, comprise optional dielectric material 600 disposed between any of electrically conductive surfaces of the invention.

In any embodiment of the invention, the lower voltage V− of the applied voltage difference $\Delta V$ may be, but is not necessarily, a system, chassis or other ground.

Referring now to FIGS. 9-12, an embodiment of an electrostatic pressure force apparatus of the invention 002 is depicted in which the invention comprises an object having multiple stages, each stage comprising a set of opposing electrodes 101$_n$ and 102$_n$ attached, and, in embodiments, fixedly attached, by non-electrically conductive means 103 as previously described in regard to FIGS. 4-8. A plurality of n sets of electrode surfaces 400, each set of electrode surfaces 400 comprising 101a$_n$, 100a$_n$ and 102a$_n$, may comprise a multi-stage embodiment of the invention comprising n sets of electrode surfaces 400. For each set of electrically conductive electrode surfaces, an applied voltage difference $\Delta V_n$ between first electrode electrically conductive surfaces 101a$_n$ and 100a$_n$ and second electrode electrically conductive surface 102a$_n$ causes a non-homogeneous electric field to be generated between electrically conductive electrode surfaces 101$_n$ and 100$_n$ and second electrically conductive electrode surface 102$_n$ as described in regards to FIGS. 4-8 hereinabove, resulting in a net electrostatic pressure force $F_{xn}$ for each set 400 of opposing electrode surfaces 101$_n$, 100$_n$ and 102$_n$ which vector sum together to result in a total net electrostatic pressure force $F_{xtot}$ acting on the object. Referring specifically to FIG. 6, a three-stage electrostatic pressure force apparatus 003 is depicted as an exemplary embodiment of a multi-stage electrostatic pressure force apparatus of the invention 002 in which n=3, and a five-stage electrostatic pressure force apparatus 004 is depicted as a further exemplary embodiment of a multi-state electrostatic pressure force apparatus of the invention in which n=5. Because the direction of the net resulting state electrostatic pressure force on each stage is independent of the polarity of the applied voltage difference $\Delta V_n$ between electrode electrically conductive surfaces 101a$_n$ and 100a$_n$ and electrode electrically conductive surface 102a$_n$ for that stage, the applied voltage to each successive electrode electrically conductive surface may be either V+ and V− as long as an applied voltage difference $\Delta V_n$ is present between electrode surfaces 101$_n$, 100$_n$ and 102$_n$ for each electrode surface set 400.

Still referring to FIGS. 9-12, it is not necessary that n be an odd number. I.e., it is not necessary that there be an odd number of electrode sets in a multi-stage embodiment of an electrostatic pressure force apparatus of the invention. It also is not necessary that each 101a$_n$ electrode electrically conductive surface be similarly shaped, that each 100a$_n$ electrode surface be similarly shaped, or that each 102a$_n$ electrode surface be similarly shaped. Said another way, each electrode and electrode electrically conductive surface comprising a multi-stage electrostatic pressure force apparatus of the invention 002 may be shaped as determined by the computational methods described herein to achieve any desired electric field and any desired resulting net electrostatic pressure force $Fx_n$ on any particular stage, that thus to determine the total resulting net electrostatic pressure force $Fx_{tot}$ acting on the object, which is the vector sum of all resulting net electrostatic pressure force $Fx_n$ acting on each stage.

Referring now to FIG. 13-16, an exemplary embodiment of the electrostatic pressure force apparatus of the invention 005 is depicted in which electrode 101 comprises a plurality of electrode electrically conductive surfaces 101a$_{n+1}$ and a plurality of electrode electrically conductive surfaces 100a$_n$ that oppose electrode electrically conductive surface 102a of electrode 102, establishing a non-homogeneous electric field between the plurality of electrode electrically conductive surfaces 101a$_{n+1}$ and the plurality of electrode electrically conductive surfaces 100a$_n$ and electrode electrically conductive surface 102a that results in a resulting net electrostatic pressure force $F_x$tot as described herein. This embodiment comprises a plurality of n "blades" 100, labeled 100$_1$ through 100$_n$. The shape of blades 100 may take any shape desired by a user, as determined by the computational techniques described herein, in order to achieve a desired electrostatic pressure forces $F_1$-$F_n$, and a resulting net total electrostatic pressure force $F_x$tot acting on said object. The shape of blades 100 is depicted as examples only in the figures. In embodiments, blades 100 may take any geometric shape and may extend between one electrically conductive surface of the invention to another electrically conductive surface, and may be at least partially electrically conductive such the two surfaces it extends between are electrically conductively connected. Thus, elements 700 of FIG. 29 may be considered blades.

Figure 17:
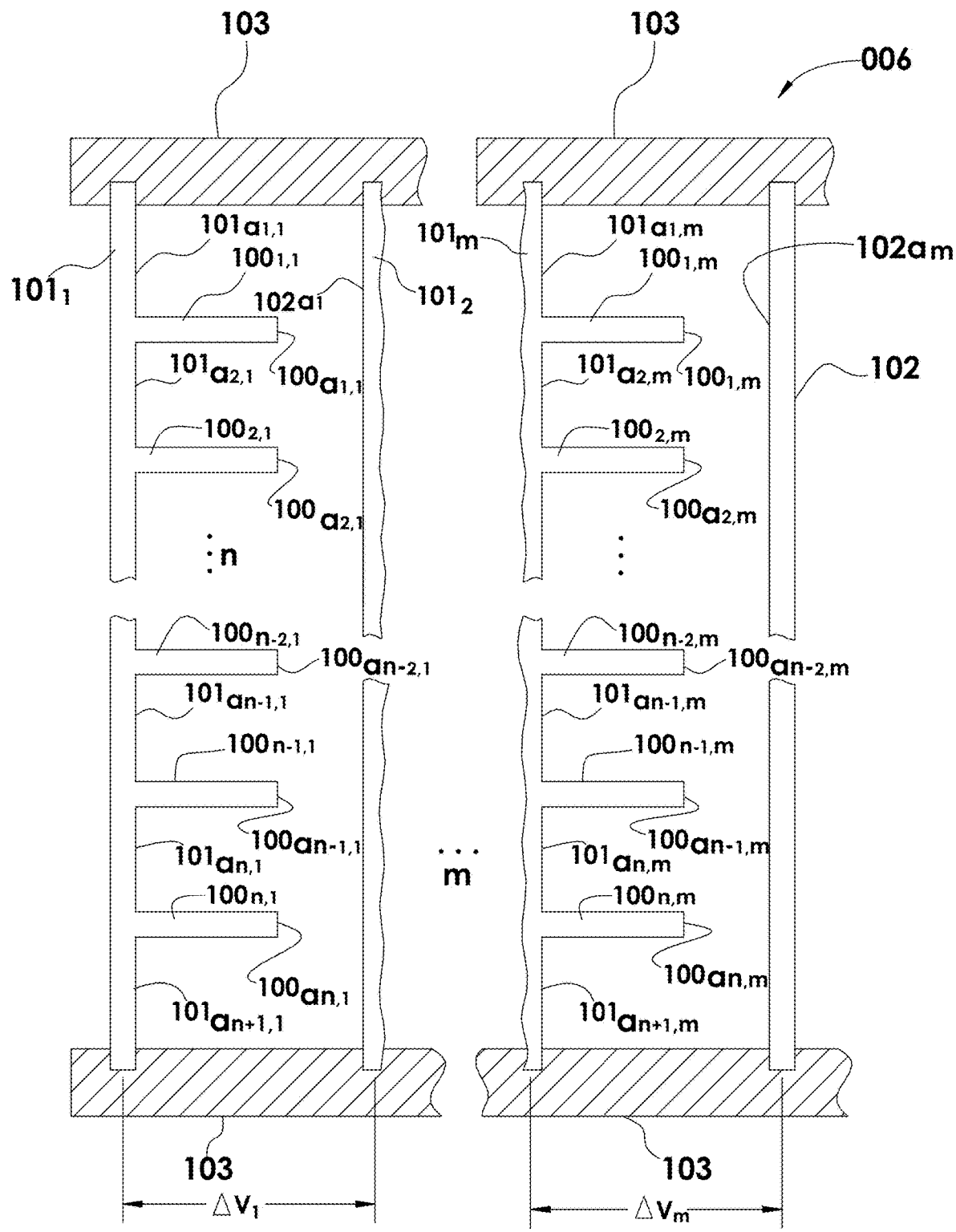
FIG. 17 depicts a non-limiting exemplary embodiment of a multistage force apparatus of the invention in which each first electrode comprises a plurality of proximal and distal electrode surfaces.

Referring now to FIG. 17, a further exemplary multi-stage embodiment of the electrostatic pressure force apparatus of the invention 006 is depicted in which the invention comprises an object having m stages identified successively as stage 1 through stage m. In each stage, an electrode 101 comprises a plurality of electrode surfaces $101a_1$ through $101a_{n+1}$ and a plurality of electrode surfaces $100a_1$ through $100a_n$ that oppose electrode surfaces 102a, establishing a non-homogeneous electric field between the plurality of electrode electrically conductive surfaces $101a_{n+1}$ and the plurality of electrode electrically conductive surfaces $100a_n$ and electrode electrically conductive surface 102a that results in a resulting net electrostatic pressure force Fx005 as described herein. This embodiment comprises a plurality of n "blades" 100 per electrode 101, labeled $100_1$ through $100_n$. Each blade may comprise an electrically conductive electrode surface 100a as depicted in the figure, using the inventive schemes herein described. The shape of blades 100 may take any shape desired by a user in order to achieve a desired electrostatic pressure forces $F_1$-$F_n$ and a resulting net total electrostatic pressure force $F_x$tot acting on the object. Each electrode $101_{1-m}$ and 102 may be attached, and, in an embodiment, fixedly attached, by non-electrically conductive means 103.

Figure 18:
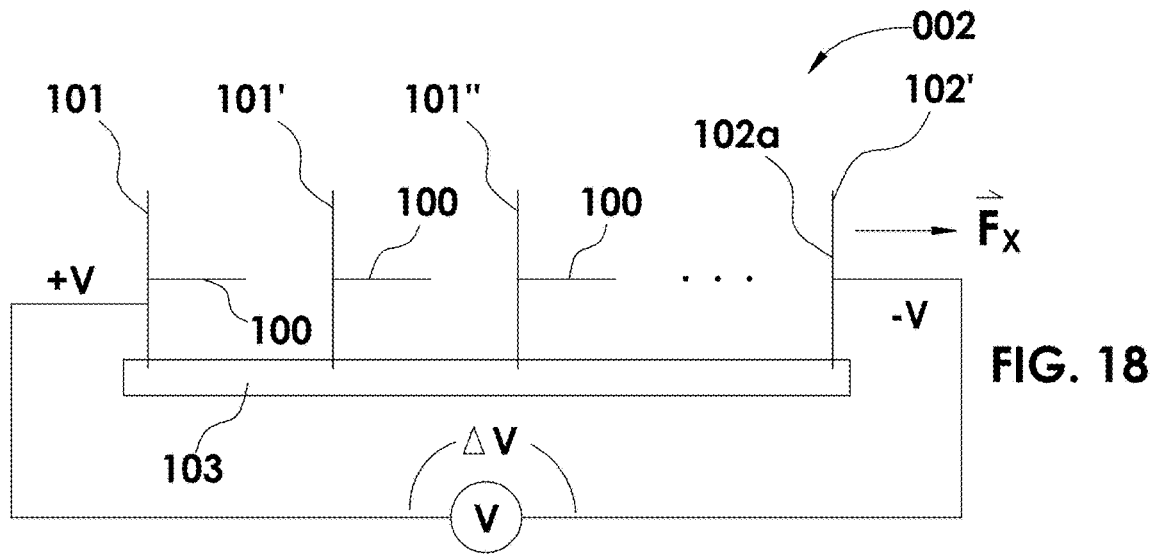
FIGS. 18-20 depicts various non-limiting exemplary embodiments of the invention in which at least one intermediate electrode is disposed between two electrodes which are subjected to a voltage difference, forming an electric field causing the intermediate electrode to be electrically polarized, and causing the generation of net resulting electrostatic pressure forces to be generated on the surfaces of the electrodes, resulting in a total net resulting electrostatic pressure force acting on the body of the invention.
Figure 19:
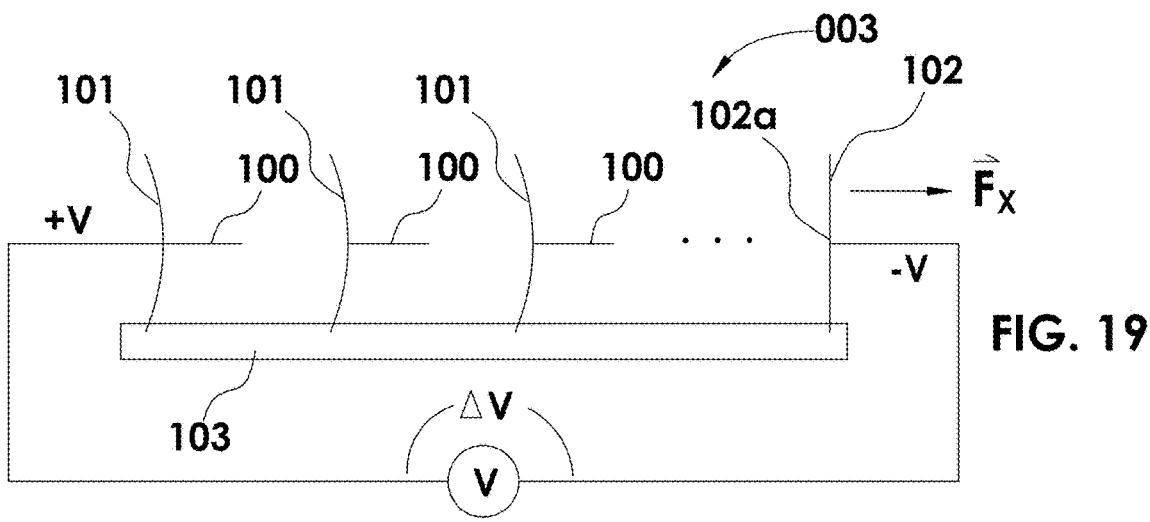
Figure 20:
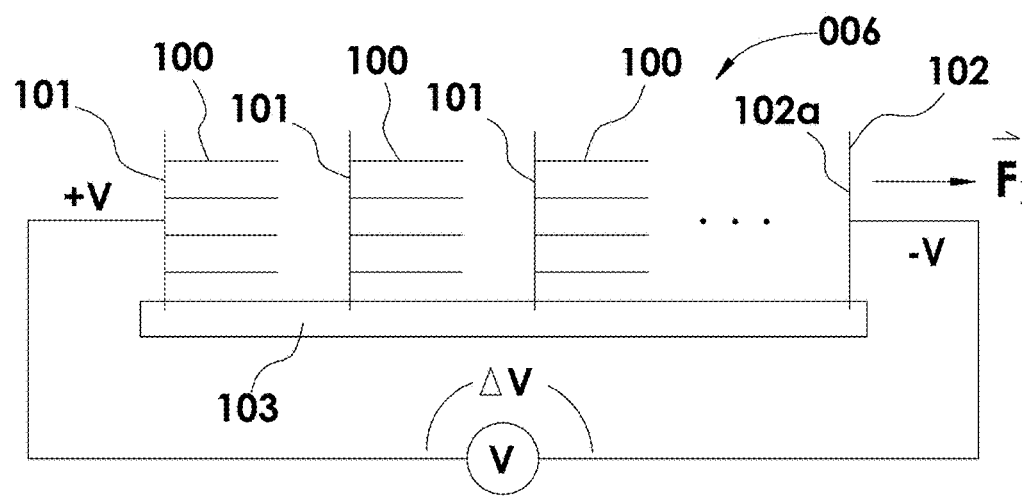

Referring now to FIGS. 18-20, embodiments of the invention are depicted in which each embodiment comprises a plurality of electrodes, each of which may be aligned along an axis, in which an outermost pair of electrodes 101' and 102' are subjected to an voltage difference ΔV, which may be supplied by a voltage source V. One or more electrodes 101" may be disposed between electrode 101' and electrode 102'. The voltage difference ΔV between electrode 101' and electrode 102' creates an electric field between them that causes electric polarization of electrodes 101". The electric field results in electrostatic pressure as herein before described acting on the conductive surfaces of one or more of the electrodes which in turn results in electrostatic pressure forces acting on the conductive surfaces of one or more of the electrodes as described herein, creating a net resulting electrostatic pressure force $F_x$ acting on each of the electrodes as described herein. The electrodes in each embodiment may be attached by non-electrically conductive means. Each of the net resulting electrostatic pressure forces $F_x$ may be summed together, resulting in a total net resulting electrostatic pressure force $F_x$tot as depicted. The specific shape of each of the electrodes may be determined by computational methods as described herein to achieve a desired net resulting electrostatic pressure force $F_x$ on each electrode, or to achieve a desired total net resulting electrostatic pressure force $F_x$tot. These examples are provided to emphasize that the computational method of the invention described herein may result in any number of geometric arrangements of electrically conducting surfaces that, when subjected to a voltage or voltage difference, may give rise to an electric field that produces electrostatic pressure on the surfaces of the object, in turn resulting in electrostatic pressure forces acting on the surfaces of the object in such a manner that a net resulting electrostatic pressure force acts on the object. In embodiments, the net resulting electrostatic pressure force is non-zero.

Multi-Blade Test Cases

An example of a test article of an embodiment of the electrostatic pressure force apparatus of the invention used to verify functionality of the invention as herein described is shown in FIG. 21. An embodiment comprising nine blades 100 arranged as depicted, each blade being substantially 0.25 inches in height, spaced 0.25 inches apart with each blade being substantially four inches in length, was fabricated. The gap between surfaces $100a_n$ and 102a (see FIG. 13) was 0.25 inches. The 0.05 inch thick blades 100 and the back plane electrode 101 were coated with a conductive paint to creative the conductive electrode surfaces. A wire carrying V+ was connected to the painted surface through the back of the device and attached using epoxy. The entire structure was then filled with high voltage epoxy dielectric which was subsequently cured. An initial ground plane was created using copper tape that only covered the electrode area of 4"×2"=8 in$^2$ on the top outside of the surface (not shown). The test article was tested by placing it onto a foam test stand that was connected using a high-tension string to a force meter (Omega® model DGF155-0.12). The test stand itself was hung from a structure using a string in a pendulum configuration. Any forces on the stand were monitored in real time. The applied voltage difference ΔV was supplied to the device as herein described using a high voltage power supply capable of providing up to +40 kVDC. The V−, or ground, side of the applied voltage difference ΔV from the power supply was connected to the copper tape. The force meter and power supplies were monitored using a LabView program.

Still referring to FIG. 21, other test configurations included replacing the foam test stand with a transparent box lined with ITO-coated PET film that was grounded. This eliminated Coulomb forces as well as ion wind forces. Forces on the box were monitored directly. Tests on the foam stand were repeated in both tension and compression mode by flipping the device 180 degrees to ensure there was no Coulomb attraction to the walls. Flipping the device ensures the forces are as described herein. Ion wind was prevented by placing the foam test stand inside a plastic bag.

Still referring to the test setup as depicted in FIG. 21, an example of the resulting force is shown in FIG. 22. The raw force is shown in red with 0.1 mN resolution. The thick dark red line is a smooth fit to the data. The black line is the applied DC voltage to the test device. Clearly there is a force in the positive direction (compression) when the voltage is applied. At +25 kV, the net average force for these two tests is approximately 237 μN. Similar tests to the one shown were repeated dozens of times. One striking verification of the theory was to increase the ground area to see if the force increased linearly. Increasing the ground area was performed by adding more copper tape to the back side which increased the surface area from 8 in$^2$ to 15 in$^2$ by coating the entire backside of the 3"×5" area. Using the computational methods of the invention, this was expected to increase the force by approximately 1.8. Measurements after the application of copper tape to the full backside gave an average over several runs of 421 μN which is an increase of 1.77. Thus this test result correlated with the expected result, which was produced using the computational methods of the invention, very closely.

Several additional tests were shown to be consistent with the theory. The electrostatic pressure force has been shown to be a function of the square of the applied voltage difference. This was expected theoretically but is also observed experimentally (as well as computationally, using the computational method of the invention) as shown in FIG. 23A. Using this same test article, tests were performed at a variety of different voltages and the corresponding averages were measured.

Other test articles using a variety of different dielectrics 600, coatings, electrodes, and geometric arraignments of the electrically conductive surfaces were also shown to be consistent with the claimed invention. Test results for styrofoam EPF devices is shown in FIG. 23B. The force's squared dependence on voltage has been observed repeatedly over a variety of shape and geometries tested by the inventors.

Referring now to FIG. 24, the invention may comprise a plurality of blades 100 which affect a larger area increasing, the net resulting electrostatic pressure force. The net resulting electrostatic pressure force grows as the number of blades 100 increases which affects a larger surface area on the ground plane depending on the spacing between blades 100, length of blades 100, the gap between electrodes, etc. There are many parameters of the geometric arrangement of the invention which may be optimized to achieve a desired net resulting electrostatic pressure using the computational methods of the invention.

Referring now to FIG. 25, it may be seen that COMSOL is a very useful tool for performing the computations required to achieve a desired net resulting electrostatic pressure force. For example, using such computational techniques, it is shown that there is little benefit in increasing the length of the blades 100 once it exceeds the spacing between the blades. There is little, or no, electric field reaching the electrode surface(s) 101a of electrode 101 which is Faraday shielded by the larger electrode blade 100, all at the same voltage.

Other aspects of the geometric arrangement of the electrostatic pressure force apparatus of the invention can be modeled by the computational techniques of the invention as well such as, for example, the thickness of the blades 100. As the blades get thicker, the area of them increases and the resulting pressure on the V+ side starts to compete with the pressure on the ground side. At some point, the pressure on the V+ side increases enough to overcome the EPF on the ground side and the force switches directions. Switching of the direction of the force based on the geometry alone has been observed by our team.

In any embodiment of the invention, gas breakdown can be prevented using an optional dielectric medium 600 in between the electrodes. The dielectric 600 can possess high dielectric strengths to reach local electric fields >$10^6$ V/m depending on the dielectric used. Polyimide, PTFE, Styrofoam, epoxy, RTV and high voltage putty have all been used to increase the voltage on the electrodes limiting breakdown effects. For example, the test article of FIG. 23A was filled with high voltage epoxy while the test articles of FIG. 23B were filled with polyimide and foam. These are but some examples of the use of optional dielectric material 600.

Figure 27:
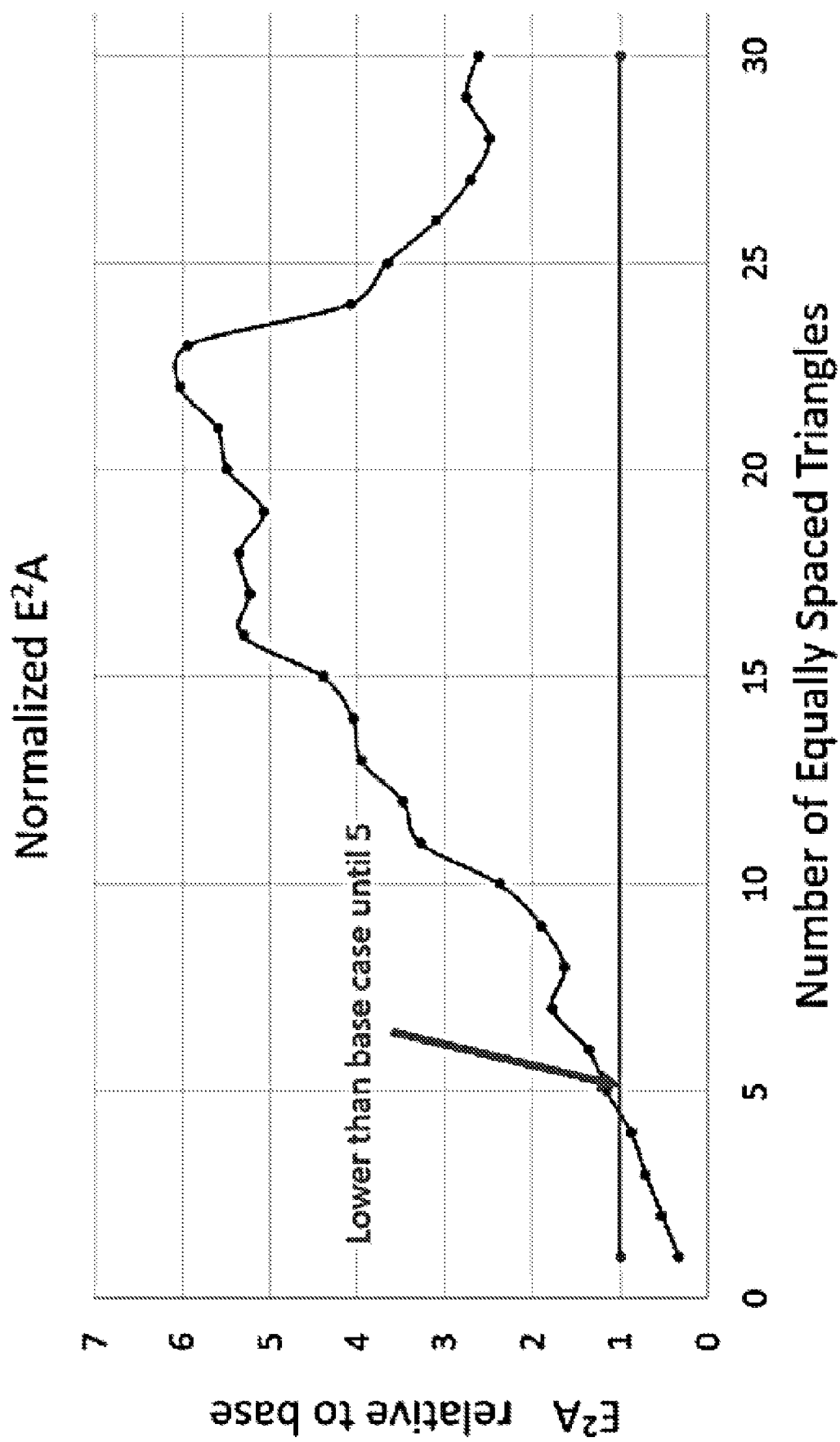
FIG. 27 depicts a graphical representation of the net resulting force of embodiments of the invention comprising various numbers of equally spaced triangles, as determined by a computational method of the invention.

Referring now to FIGS. 26 and 27, in addition to optimizing the geometric arrangement of second electrode 102 and first electrode 101 by minimizing the pressure area product, one can easily maximize the pressure area product using the computational method of the invention. FIG. 26 shows a method for increasing the electrostatic pressure force for a constant non-time-varying electric field source. Here, the electric fields on the object surfaces were calculated using computation methods provided by a free software called FEMM (Finite Element Method Magnetics) for a given ground plane geometry. These field plus their geometry was given as input to MatLab (by MathWorks®) which calculated the electrostatic pressure force. Matlab can then be used to then generate a new script that can be read by FEMM, calculate the electric fields, and then again monitor the resulting pressure force in an optimization scheme. An example is shown in FIG. 26 using triangles as the chosen feature to provide an optimal ground which increases the effective area. An exemplary embodiment of the invention comprising a plurality of triangles disposed on electrode surface 102a is depicted in FIG. 26.

Referring now to FIG. 27, the results of this case show that as a flat electrode 102 is replaced with an electrode comprising triangular shapes features comprising electrically conductive surfaces, the electrostatic pressure force will initially be reduced for less than five such features. However, as the number of equally spaced triangles features is increased, the electrostatic pressure force increases and will eventually surpass the simple flat surface. As the number of triangles increases for the given area, the net electrostatic pressure force grows until a maximum at about 23 triangle features before the net electrostatic pressure force decreases. The benefit of the triangular V– electrode seems to suggest a factor of 6× in the strength available purely by geometrical arrangement considerations alone for a given potential. As the number of triangular electrode features grows larger, the benefit of the additional electrically conductive surface area is lost as the electric field can no longer penetrate into the grooves between the triangular features due to the Faraday shielding effect. Eventually, as the number approaches infinity, the force will be the same as the original flat plane as expected. We have also studied half circles, domes of various radii and other ground shapes for optimization purposes. This is an example of the computational techniques of the invention being used to develop a desired geometric arrangement of electrically conductive surfaces in order to achieve a desired net electrostatic pressure force.

Embodiments Comprising Time Varying Applied Voltage

Then invention, in embodiments, may comprise an applied voltage difference that is a time-varying voltage difference. A more general solution to Equation (10) include this times dependence:

$$P(t)=Mv=\varepsilon_o t[E_2^2(t)A_2-E_1^2(t)A_1] \quad (12)$$

Equation (12) shows a non-linear time dependence of the momentum with a corresponding force given by:

$$F(t) = \frac{dP(t)}{dt} = \varepsilon_o t\left[2E_2\frac{dE_2}{dt}A_2 - 2E_1\frac{dE_2}{dt}A_1\right] + \varepsilon_o\left[E_2^2(t)A_2 - E_1^2(t)A_1\right] \quad (13)$$

Now the force a time-dependence which is worth discussing a few cases. The most common case would be that of a sinusoidal time dependence such that E(t)=C sin(ωt+φ). We note that $$\frac{dE(t)}{dt} = C\omega\cos(\omega t + \varphi) \quad (14)$$

$$tE(t)\frac{dE(t)}{dt} = C\omega^2 t\sin(\omega t + \varphi)\cos(\omega t + \varphi) \quad (15)$$

The average of (15) is non-zero with the extra factor of time t over a full period. The second term is identical to Equation (11) and has a nonzero average as well. For a phase shift of zero, the time dependent part (15) is negative and subtracts from the overall force. Interestingly, the force would be greatly enhanced if the phase shift $\varphi$ is nonzero and the two terms would add to a greater force. For example, with an amplitude of 100 V/m, the second term averages to be $C_2/2=5000$ $(V/m)^2$. With a zero phase shift, the contribution for the time dependent term (15) is −2500 giving a total amount of 2500. On the other hand, if there's a phase shift of 90°, then the time dependent term is +2500 giving a net of 7500 $(V/m)^2$. In general the force scales as $C_2/2$ and is either increased or decreased by an amount $C_2/4$ depending on the phase of the signal.

It is important to note that a frequency component of the time varying applied voltage plays no part in the resulting net electrostatic pressure force. Analysis of the average of the above terms shows that the frequency component cancels out. The amplitude component however, remains and thus the net electrostatic pressure force is strongly correlated to the square of the amplitude.

There are other time-dependent terms that can be utilized such as exponential decays, hyperbolic decays as well as square waves, triangle waveforms, etc. As to which is the best form to use we do not know at this time. Experimentally square waves work best but that is most likely due to overshoot since it is impossible to achieve changes in the high and low state instantaneously which would require infinite bandwidth. Such transients are known to give stronger forces [see Woodwards' MET] but their affects tend to cancel on the opposite cycle.

Thus, the applied voltage difference ΔV between opposing electrodes, in any embodiment, may comprise a time varying voltage difference that is independent of frequency.

Scalability

Referring now to FIG. 28, the ultimate goal is to have a nanoscale version of this thrust technology. FIG. 28 shows a COMSOL computational result of the force as a function of gap distance for a three-bladed EPF device (figure insert). As one moves the ground closer to the electrodes the force increases as expected for a given voltage. As long as electrical breakdown is prevented, the blade electrodes and the ground can be as close as possible.

There is no reason as to why systems comprising embodiments of the invention cannot be made on the nanoscale. The technology already exists to generate small vertical arrays called field emission arrays (FEAs). These FEAs are used for not only for television displays and related devices, they are also used for Field Emission Electric Propulsion (FEEP). FEEP rely on strong electric fields to accelerate atomic ions from the surface of a metal (cathode) toward a grounded plate. A replacement for current FEAs is the use of carbon nanotubes (CNT) which are more robust and possess superior electrical properties. CNTs can be made to conform not only to the geometries of FEAs but also small nanowires at the microscopic scales.

In further embodiments, the invention may comprise nanostructures. Referring now to FIG. 29, in further embodiments of the invention, known fabrication techniques may be utilized to fabricate any physical embodiment of the invention that comprises a first electrode with at least one proximal electrode surface 100a, at least one structure 700, and, in embodiments, a plurality of structures 700, for disposing proximal electrically conductive surface 100a a distance from distal electrically conductive surface 101a, and at least one opposing electrode surface 102a (not shown in FIG. 29) as hereinbefore described. The exterior surfaces of structure 700, which may extend from electrically conductive surface 101a to proximal electrically conductive surfaces 100a, may be at least partially electrically conductive such that proximal electrically conductive surfaces 100a are in electrical contact with distal electrically conductive surface 101a. One such technology is demonstrated in FIG. 29 [Chiu 2006]. In this embodiment, wires made of several CNTs may be synthesized using chemical vapor deposition and grown vertically on an Si wafer array. The transfer of the CNTs onto a $Al_2O_3$ substrate preprinted with silver paste is shown in FIG. 29. The purpose of the research was to develop better CNTs with enhanced field emission properties. The result is that CNTs can be generated in a small parallel wire-like pattern on the microscopic scale. An embodiment of the present invention may comprise carbon nanotubes that, on a very small scale such as a nanoscale, may form the structure for supporting and forming at least one proximal electrode surface 100a, at least one distal electrode surface 101a, and at least one opposing electrode surface 102a as hereinbefore described, or, alternatively, such structures may be utilized to form unique electrode shapes for achieving any desired electrostatic pressure and resulting net electric force.

Further Embodiments of the Claimed Invention

One exciting attribute is the possibility of making the electrodes and the ground system transparent. Indium Tin Oxide (ITO) used for touch screens, cell phones, etc. has widely been used a successful transparent conductor for decades. Since the EPF device does not require high currents, the lower resistivity of conventional non-transparent conductive materials such as copper, silver, gold, etc. is not necessary. Thus the entire EPF system can be made transparent similar to glass. One application of this technology would be to use it as a propulsive thrust for spacecraft as a glass cover on top of the required solar panels. The skin of a spacecraft can be used for station keeping or thrust maneuvers. This application will save volume and mass but also extends the life of the spacecraft which to date is solely limited by propellant availability.

In a traditional chemical or electric enhanced chemical rocket propulsion system the velocity added to the propulsive mass fraction comes from the heating of material or accelerating the mass fraction in some kind of electromagnetic field. In all cases, the propulsive mass fraction is expelled from the spacecraft. The change in velocity of the expelled mass times the propulsive mass fraction is the propulsive momentum available to be transferred to the spacecraft. Specifically, in chemical rocketry, the mass fraction acceleration energy comes from the breaking of high energy chemical bonds in the propellant. In ion/plasma chemical rocketry the delta velocity comes from accelerating ionized gas in an electromagnetic field. In solar sailing, low mass/high energy solar wind is collected on a massive scale to provide the physical momentum needed to accelerate the spacecraft. No matter the chemical or electrical enhancement, all rocket propulsion systems rely on action/reaction physics to achieve motion. To move the spacecraft, high velocity mass must transfer its physical momentum to the spacecraft prior to being ejected. EPF propulsion is not like these other forms of propulsion in that no mass is consumed or expelled in the conversion of Electromagnetic Potential into Physical Momentum. Electrical potential is converted into physical momentum via a unique application of electrostatic physics and unique reactor design.

In all classical or electrically-enhanced chemical rocketry propulsion systems, once the propellant is exhausted the propulsion system becomes useless. In all cases, the amount of energy that can be packed into the propellant is a function of how chemically or electrically unstable the material is. The trade between safety and economy tends to make spacecraft large and expensive with very small payload mass fractions. These propulsion systems all have life spans and efficiencies that are directly dependent on the propellant they consume. Once the propellant is exhausted, the propulsion system shuts down and its mass fraction of the spacecraft becomes waste. The mass fraction of the space vehicle devoted to conventional chemical or electrical/chemical propulsion including fuel, oxidizer, storage tanks, pumps, rocket motors, and structure to hold all this together is upwards of 98% of the total mass of the spacecraft. Unique to EPF propulsion, the mass fraction devoted to propulsion can be as little as 2% of the total mass of the spacecraft. As no mass is consumed or expelled in the production of thrust, no spacecraft mass fraction need be reserved for propulsion. As the propulsion system need never be turned off, the mass fraction dedicated to making thrust is never wasted.

In direct contrast to chemical rocketry, an EPF propulsion system does not require any fuel or oxidizer or mechanical systems or propellant mass to be consumed or expelled in any way. EPF creates physical momentum from stored electrical energy in a hermetically sealed reactor, and over time, that created physical momentum is realized as physical force. The spacecraft is accelerated by the application of this physical force. As no mass fraction of the spacecraft is expended to create thrust, the lifespan of the EPF thruster, and thereby the spacecraft housing them, are near limitless. Realistic mass fractions of the spacecraft devoted to propulsion could be as little as 2% of the total mass of the spacecraft. This projected low mass fraction is in direct contrast to the 98% mass fractions currently accepted for chemical/electric spacecraft propulsion systems. Low propulsion mass fraction, very high efficiency, and never having to turn off the propulsion will bring about a revolution in the exploration of space. Travel times to the planets will be measured in days as opposed to months/years. Greater mass fractions of the spacecraft will be used for the payloads.

In chemical/electric rocketry propulsion, the physical momentum available to the spacecraft is limited by the exit velocity of the expelled mass. All chemical/electric forms of spacecraft propulsion are limited to accelerating the expelled mass at some small fraction of the speed of light. As a result of this restriction, the maximum velocity any chemical rocket propulsion system can achieve is a very small fraction of the speed of light. EPF propulsion does not require the expulsion of mass to transfer physical momentum and therefore has the capability of propelling a spacecraft to a significant fraction of the speed of light.

Any embodiment of the invention may comprise any element or feature described herein, in any quantity and in any combination, and in any order.

In general, the invention may comprise any number of electrodes, disposed on any number of bodies, in any configuration, with applied voltage(s), such as may be determined to achieve a desired net resulting electrostatic pressure force or forces acting the body or plurality of bodies.

In any embodiment, the voltage differences between the electrodes may be time-varying, non-time-varying, or any combination thereof as between the electrodes.

In any embodiment, the net resulting electrostatic pressure force may be characterized as being the vector sum of all electrostatic pressure forces acting on the object, and the net resulting electrostatic pressure force may be characterized as acting along an axis. In the figures, the axis along which a net resulting electrostatic pressure force acts may be depicted as the x axis of a three-dimensional coordinate system for convenience. However, the coordinate axis depicted in the figures is merely exemplary. A user or designer of a system implementing the inventive schemes disclosed and claimed herein may elect to utilize any three-dimensional coordinate system orientation they choose. Any net resulting electrostatic pressure force may act in any direction desired as may be predetermined and implemented by the computational techniques described herein, and thus does not necessarily need to align with any particular axis of a three-dimensional coordinate system.

What is claimed is:

1. An apparatus for generating a force on an object, comprising:
    an object comprising at least one electrode having at least one electrically conductive surface,
    wherein at least one voltage is applied to said at least one electrically conductive surface;
    wherein the application of said at least one voltage to said at least one electrically conductive surface generates an electric field giving rise to an electrostatic pressure acting on at least one surface of said object, thereby generating a electrostatic pressure force on said at least one surface;
    wherein said electrostatic pressure force is characterized by a net resulting electrostatic pressure force acting on said object.

2. The apparatus for generating a force of claim 1, wherein said net resulting electrostatic pressure force is characterized as being the vector sum of all electrostatic pressure forces acting on said object, and wherein said net resulting electrostatic pressure force is characterized as acting along an axis.

3. The apparatus for generating a force of claim 1, wherein the shape and geometric arrangement of the conductive surfaces and the value of the at least one voltage, are each defined by computational methods to achieve a desired net resulting electrostatic pressure force.

4. The electrostatic pressure force apparatus of claim 1, wherein said voltage is time-varying.

5. An apparatus for generating a force on an object, comprising:
    an object comprising a plurality of electrically conductive surfaces, each of said electrically conductive surfaces attached to one another by a non-electrically conductive structure;
    wherein a voltage is applied to two or more of said electrically conductive surfaces, each of said electrically conductive surfaces receiving a different voltage, thus creating a voltage difference as between the electrically conductive surfaces;
    wherein the voltage difference generates an electric field giving rise to an electrostatic pressure acting on at least one surface of said object, thereby generating an electrostatic pressure force on said at least one surface of said object;
    wherein said electrostatic pressure force is characterized by a net resulting electrostatic pressure force acting on said object.

6. The apparatus for generating a force of claim 5, wherein said net resulting electrostatic pressure force is characterized as being the vector sum of all electrostatic pressure forces acting on said object, and wherein said net resulting electrostatic pressure force is characterized as acting on said object along an axis.

7. The apparatus for generating a force of claim 5, wherein the shape and geometric arrangement of the conductive surfaces and the value of the at least one voltage, are each defined by computational methods to achieve a desired net resulting electrostatic pressure force acting on said object.

8. The apparatus for generating a force of claim 5, wherein:
said plurality of electrically conductive surfaces is further defined as at least one set of opposing electrically conductive surfaces, wherein each of said set of opposing electrically conductive surfaces comprises a first electrically conductive surface and an opposing second electrically conductive surface; and
wherein said voltage is further defined as a first voltage and a second voltage, each of said first voltage and said second voltage having a different voltage value, forming an voltage difference as between them; and
wherein said first voltage is applied to said first electrically conductive surface, and said second voltage is applied to said second electrically conductive surface, causing said electric field to be generated between said first electrically conductive surface and said second electrically conductive surface.

9. The apparatus for generating a force of claim 8, wherein:
said first electrically conductive surface comprises at least one proximal electrically conductive surface and at least one distal electrically conductive surface, said at least one proximal electrically conductive surface being in closer proximity to said second electrically conductive surface than said at least one distal electrically conductive surface.

10. The apparatus for generating a force of claim 9, further comprising an electrically conductive surface that extends from said at least one electrically conductive proximal surface distal surface to said at least one electrically conductive proximal surface proximal surface.

11. The electrostatic pressure force apparatus of claim 5, wherein said second electrically conductive surface is further defined as comprising a flat planar surface.

12. The electrostatic pressure force apparatus of claim 5, wherein said at least one proximal electrically conductive surface and at least one distal electrically conductive surface are further defined as a plurality of proximal electrically conductive surfaces and a plurality of distal electrically conductive surfaces, respectively.

13. The electrostatic pressure force apparatus of claim 5, wherein said at least one set of electrically conductive opposing surfaces is further defined as a plurality of sets of electrically conductive opposing surfaces, resulting in a total net resulting electrostatic pressure force equaling the vector sum of all resulting net electrostatic pressure forces generated by the electrostatic pressure operating on surfaces of the object, said total net resulting electrostatic pressure force acting on said object.

14. The electrostatic pressure force apparatus of claim 13, wherein each set of electrically conductive opposing surfaces are aligned along an axis that is collinear with the vector of each of said resulting net electrostatic pressure force, such that each of said resulting net electrostatic pressure forces is summed into a total net electrostatic pressure force acting on said body along said axis.

15. The electrostatic pressure force apparatus of claim 10, wherein said electrically conductive distal surface, said electrically conductive surface extending from said electrically conductive distal surface to said electrically conductive proximal surface, and said electrically conductive proximal surface form a blade configuration.

16. The electrostatic pressure force apparatus of claim 9, wherein each of said first electrically conductive surfaces comprises a plurality of electrically conductive proximal surfaces and a plurality of electrically conductive distal surfaces, wherein each electrically conductive proximal surface is in electrical communication with at least one electrically conductive distal surface by an electrically conductive surface extending from said at least one electrically conductive distal surface to said electrically conductive proximal surface.

17. The electrostatic pressure force apparatus of claim 13, wherein each of said first electrically conductive surfaces of each set of electrically conductive surfaces comprises a plurality of electrically conductive proximal surfaces and a plurality of electrically conductive distal surfaces, wherein each electrically conductive proximal surface is in electrical communication with at least one electrically conductive distal surface by an electrically conductive surface extending from said at least one electrically conductive distal surface to said electrically conductive proximal surface.

18. The electrostatic pressure force apparatus of claim 5, wherein each of said electrically conductive surfaces comprise at least one carbon nanotube.

19. The electrostatic pressure force apparatus of claim 5, wherein each of said electrically conductive surfaces comprises a plurality of carbon nanotubes.

20. The electrostatic pressure force apparatus of claim 5, wherein said voltage difference is time-varying.

21. An electrostatic pressure force thruster for a vehicle, comprising:
a structure comprising a plurality of electrically conductive surfaces, each of said electrically conductive surfaces attached to one another by non-electrically conductive means, forming a structure adapted to be attached to a vehicle having a center of mass;
wherein a voltage is applied to two or more of said electrically conductive surfaces, each of said electrically conductive surfaces receiving a different voltage, thus creating a voltage difference as between the electrically conductive surfaces;
wherein the voltage difference generates an electric field giving rise to a non-uniform electrostatic pressure acting on at least one surface of said object, thereby generating a non-uniform electrostatic pressure force on said at least one surface of said object;
wherein said non-uniform electrostatic pressure force is characterized by a net resulting electrostatic pressure force acting on said object, said net resulting electrostatic pressure force being characterized as having a vector;
wherein said resulting net electrostatic pressure force acts on and motivates said vehicle to which said structure is attached when said voltages are applied to said electrically conductive surfaces.

22. The electrostatic pressure force thruster for a vehicle of claim 21, wherein said net resulting electrostatic pressure force passes through said center of mass of said vehicle.

23. The method for generating a force on an object of claim 21, wherein said net resulting electrostatic pressure force is characterized as being the vector sum of all electrostatic pressure forces acting on said object.

24. The method for generating a force on an object of claim 21, wherein said at least one conductive surface is further defined as two opposing conductive surfaces, and wherein said at least one voltage is further defined as a first voltage and a second voltage, said first and said second voltages are of different voltage value such that together they form an voltage difference, and wherein said first voltage is applied to said first conductive surface, and said second voltage is applied to said second conductive surface.

25. The method of claim 21;
further comprising the step of using a computational method to determine the shape and geometric arrangement of said at least one conductive surface, and to determine the value of the at least one voltage, so as to achieve a desired net resulting electrostatic pressure force acting on said object;
wherein said computational method comprises the steps of:
  a. defining a geometric arrangement of each of the electrically conductive surfaces;
  b. selecting an initial value for said at least one voltage;
  c. determining the resulting electric field intensity at each point along said electrically conductive surfaces;
  d. determining the resulting electrostatic pressure force acting on surfaces of said object;
  e. summing, in vector fashion, all resulting electrostatic pressure forces acting on each of said surfaces of said object to determine a computed total net resulting electrostatic pressure force acting on said object;
  f. comparing said computed total net resulting electrostatic pressure force to a desired net resulting electrostatic pressure force for acting on said object; and
  g. iteratively changing the geometric arrangement of each of the electrically conductive surfaces or the value of the at least one voltage and repeating steps c.-f. until the desired net resulting electrostatic pressure force acting on said object is achieved.

26. A method for generating a force on an object, comprising the steps of
  a. Providing an object having at least one electrically conductive surface;
  b. Generating electrostatic pressure on at least one surface of said object by applying at least one voltage to the at least one conductive surface, said at least one voltage generating an electric field, said electric field giving rise to an electrostatic pressure acting on said at least one surface thereby generating a electrostatic pressure force on said at least one conductive surface, wherein said electrostatic pressure force acts on said object.

* * * * *